United States Patent
Miranda et al.

(10) Patent No.: US 11,284,054 B1
(45) Date of Patent: Mar. 22, 2022

(54) SYSTEMS AND METHOD FOR CAPTURING, PROCESSING AND DISPLAYING A 360° VIDEO

(71) Applicant: Largo Technology Group, Inc., Homestead, FL (US)

(72) Inventors: Hermelo Miranda, Homestead, FL (US); Robert Uria, Miami, FL (US)

(73) Assignee: LARGO TECHNOLOGY GROUP, LLC, Homestead, FL (US)

(*) Notice: Subject to any disclaimer, the term of this patent is extended or adjusted under 35 U.S.C. 154(b) by 149 days.

(21) Appl. No.: 16/554,827

(22) Filed: Aug. 29, 2019

Related U.S. Application Data

(60) Provisional application No. 62/725,201, filed on Aug. 30, 2018.

(51) Int. Cl.
| | |
|---|---|
| *H04N 13/122* | (2018.01) |
| *H04N 13/117* | (2018.01) |
| *H04N 13/156* | (2018.01) |
| *H04N 13/139* | (2018.01) |
| *H04N 13/282* | (2018.01) |

(52) U.S. Cl.
CPC ......... *H04N 13/122* (2018.05); *H04N 13/117* (2018.05); *H04N 13/139* (2018.05); *H04N 13/156* (2018.05); *H04N 13/282* (2018.05)

(58) Field of Classification Search
CPC .. H04N 13/122; H04N 13/117; H04N 13/156; H04N 13/139; H04N 13/282
See application file for complete search history.

(56) References Cited

U.S. PATENT DOCUMENTS

| | | |
|---|---|---|
| 4,974,073 A | 11/1990 | Inova |
| 5,136,390 A | 8/1992 | Inova et al. |
| 6,393,163 B1 | 5/2002 | Burt et al. |
| 6,480,175 B1 | 11/2002 | Schneider |
| 6,545,685 B1 | 4/2003 | Dorbie |
| 6,568,816 B2 | 5/2003 | Mayer, III et al. |
| 6,570,623 B1 | 5/2003 | Li et al. |
| 6,760,075 B2 | 7/2004 | Mayer, III et al. |
| 6,762,789 B1 * | 7/2004 | Sogabe ............ G08B 13/19691 348/36 |
| 7,015,954 B1 | 3/2006 | Foote et al. |
| 7,620,909 B2 | 11/2009 | Park et al. |

(Continued)

*Primary Examiner* — Jessica M Prince

(57) ABSTRACT

A 360° video capture, processing and display system includes a 360° video camera to capture a 360° raw video file, and a 360° video processing assembly to generate a 360° equirectangular geographic projection from each frame of the 360° raw video file. A 360° video processing algorithm captures a plurality of viewport images from each of a plurality of equirectangular geographic projections. A composite video displays includes a plurality of viewport images from a corresponding one of each of the 360° equirectangular geographic projections, wherein at least one of a top or bottom composite video display comprises a seamless integration of corresponding ones of the plurality of viewport images. The 360° video capture, processing and display system generates a multi-platform compatible processed 360° video file comprising the plurality of composite video displays, wherein the multi-platform compatible processed 360° video file is viewable on a video display assembly.

20 Claims, 22 Drawing Sheets

(56) References Cited

U.S. PATENT DOCUMENTS

| | | |
|---|---|---|
| 2003/0011619 A1 | 1/2003 | Jacobs et al. |
| 2017/0103091 A1* | 4/2017 | Kontkanen ............. G06T 17/00 |
| 2017/0339391 A1* | 11/2017 | Zhou ..................... H04L 65/607 |
| 2017/0366808 A1* | 12/2017 | Lin ........................ H04N 19/82 |
| 2018/0098131 A1* | 4/2018 | Zhou .................. H04N 21/6373 |
| 2018/0192001 A1* | 7/2018 | Boyce ................... H04N 19/46 |
| 2019/0026934 A1* | 1/2019 | Shih ..................... H04N 19/154 |
| 2019/0289327 A1* | 9/2019 | Lin ........................ H04N 19/82 |
| 2020/0120359 A1* | 4/2020 | Hanhart ............... H04N 19/167 |

* cited by examiner

TABLE 3

Predetermined Video Display Layout (43) - BVT Layout Type 1

| | | |
|---|---|---|
| Top Viewpoint Height (45): | 755 | Top Display Height Ratio (44): | 58.98% |
| Navigation Menu (59) Height: | 40 | Navigation Menu (59) Height Ratio: | 3.13% |
| Bottom Viewpoint Height (45): | 485 | Bottom Display Height Ratio (44): | 37.89% |

Top Composite Video Display (51)

| Viewport Image | Viewport Positioning Cordinates (47) | | Viewport Width (46) (pixels) | Viewport Height (45) (pixels) | Viewport FOV Angle (48) (degrees) | Viewpoint Heading Angle (49) (degrees) |
|---|---|---|---|---|---|---|
| | x (pixels) | y (pixels) | | | | |
| Top Left (52) | Top_Left_x | Top_Left_y | Top_Left_Width | Top_Left_Height | Top_Left_FOV | Top_Left_Heading_Ang |
| | 0 | 0 | 640 | 755 | 70 | 19.7 |
| Top Center (53) | Top_Center_x | Top_Center_y | Top_Center_Width | Top_Center_Height | Top_Center_FOV | Top_Center_Heading_Ang |
| | 640 | 0 | 640 | 755 | 70 | 90.0 |
| Top Right (54) | Top_Right_x | Top_Right_y | Top_Right_Width | Top_Right_Height | Top_Right_FOV | Top_Right_Heading_Ang |
| | 1280 | 0 | 640 | 755 | 70 | 160.4 |

Bottom Composite Video Display (55)

| Viewport Image | Viewport Positioning Cordinates (47) | | Viewport Width (46) (pixels) | Viewport Height (45) (pixels) | Viewport FOV Angle (48) (degrees) | Viewpoint Heading Angle (49) (degrees) |
|---|---|---|---|---|---|---|
| | x (pixels) | y (pixels) | | | | |
| Bottom Left (56) | Bottom_Left_x | Bottom_Left_y | Bottom_Left_Width | Bottom_Left_Height | Bottom_Left_FOV | Bottom_Left_Heading_Ang |
| | 0 | 795 | 640 | 485 | 70 | 179.3 |
| Bottom Center (57) | Bottom_Center_x | Bottom_Center_y | Bottom_Center_Width | Bottom_Center_Height | Bottom_Center_FOV | Bottom_Center_Heading_Ang |
| | 640 | 795 | 640 | 485 | 70 | 270.0 |
| Bottom Right (58) | Bottom_Right_x | Bottom_Right_y | Bottom_Right_Width | Bottom_Right_Height | Bottom_Right_FOV | Bottom_Right_Heading_Ang |
| | 1280 | 795 | 640 | 485 | 70 | 360.8 |

FIG. 8

TABLE 4

Predetermined Video Display Layout (43) - BVT Layout Type 2

| | | |
|---|---|---|
| Top Viewpoint Height (45): | 853 | Top Display Height Ratio (44): 66.64% |
| Navigation Menu (59) Height: | 40 | Navigation Menu (59) Height Ratio: 3.13% |
| Bottom Viewpoint Height (45): | 387 | Bottom Display Height Ratio (44): 30.23% |

Top Composite Video Display (51)

| Viewport Image | Viewport Positioning Cordinates (47') | | Viewport Width (46) (pixels) | Viewport Height (45) (pixels) | Viewport FOV Angle (48) (degrees) | Viewpoint Heading Angle (49) (degrees) |
|---|---|---|---|---|---|---|
| | x (pixels) | y (pixels) | | | | |
| Top Left (52) | Top_Left_x | Top_Left_y | Top_Left_Width | Top_Left_Height | Top_Left_FOV | Top_Left_Heading_Ang |
| | 0 | 0 | 640 | 853 | 70 | 26.4 |
| Top Center (53) | Top_Center_x | Top_Center_y | Top_Center_Width | Top_Center_Height | Top_Center_FOV | Top_Center_Heading_Ang |
| | 640 | 0 | 640 | 853 | 70 | 90.0 |
| Top Right (54) | Top_Right_x | Top_Right_y | Top_Right_Width | Top_Right_Height | Top_Right_FOV | Top_Right_Heading_Ang |
| | 1280 | 0 | 640 | 853 | 70 | 153.7 |

Bottom Composite Video Display (55)

| Viewport Image | Viewport Positioning Cordinates (47') | | Viewport Width (46) (pixels) | Viewport Height (45) (pixels) | Viewport FOV Angle (48) (degrees) | Viewpoint Heading Angle (49) (degrees) |
|---|---|---|---|---|---|---|
| | x (pixels) | y (pixels) | | | | |
| Bottom Left (56) | Bottom_Left_x | Bottom_Left_y | Bottom_Left_Width | Bottom_Left_Height | Bottom_Left_FOV | Bottom_Left_Heading_Ang |
| | 0 | 893 | 640 | 387 | 70 | 167.7 |
| Bottom Center (57) | Bottom_Center_x | Bottom_Center_y | Bottom_Center_Width | Bottom_Center_Height | Bottom_Center_FOV | Bottom_Center_Heading_Ang |
| | 640 | 893 | 640 | 387 | 70 | 270.0 |
| Bottom Right (58) | Bottom_Right_x | Bottom_Right_y | Bottom_Right_Width | Bottom_Right_Height | Bottom_Right_FOV | Bottom_Right_Heading_Ang |
| | 1280 | 893 | 640 | 387 | 70 | 372.4 |

FIG. 9

TABLE 5

Predetermined Video Display Layout (43) - BVT Layout Type 3

| | | |
|---|---|---|
| Top Viewpoint Height (45): | 960 | Top Display Height Ratio (44): 75.00% |
| Navigation Menu (59) Height: | 40 | Navigation Menu (59) Height Ratio: 3.13% |
| Bottom Viewpoint Height (45): | 280 | Bottom Display Height Ratio (44): 21.88% |

Top Composite Video Display (51)

| Viewport Image | Viewport Positioning Cordinates (47) | | Viewport Width (46) (pixels) | Viewport Height (45) (pixels) | Viewport FOV Angle (48) (degrees) | Viewpoint Heading Angle (49) (degrees) |
|---|---|---|---|---|---|---|
| | x (pixels) | y (pixels) | | | | |
| Top Left (52) | Top_Left_x<br>0 | Top_Left_y<br>0 | Top_Left_Width<br>640 | Top_Left_Height<br>960 | Top_Left_FOV<br>70 | Top_Left_Heading_Ang<br>32.0 |
| Top Center (53) | Top_Center_x<br>640 | Top_Center_y<br>0 | Top_Center_Width<br>640 | Top_Center_Height<br>960 | Top_Center_FOV<br>70 | Top_Center_Heading_Ang<br>90.0 |
| Top Right (54) | Top_Right_x<br>1280 | Top_Right_y<br>0 | Top_Right_Width<br>640 | Top_Right_Height<br>960 | Top_Right_FOV<br>70 | Top_Right_Heading_Ang<br>148.1 |

Bottom Composite Video Display (55)

| Viewport Image | Viewport Positioning Cordinates (47) | | Viewport Width (46) (pixels) | Viewport Height (45) (pixels) | Viewport FOV Angle (48) (degrees) | Viewpoint Heading Angle (49) (degrees) |
|---|---|---|---|---|---|---|
| | x (pixels) | y (pixels) | | | | |
| Bottom Left (56) | Bottom_Left_x<br>0 | Bottom_Left_y<br>1000 | Bottom_Left_Width<br>640 | Bottom_Left_Height<br>280 | Bottom_Left_FOV<br>70 | Bottom_Left_Heading_Ang<br>152.3 |
| Bottom Center (57) | Bottom_Center_x<br>640 | Bottom_Center_y<br>1000 | Bottom_Center_Width<br>640 | Bottom_Center_Height<br>280 | Bottom_Center_FOV<br>70 | Bottom_Center_Heading_Ang<br>270.0 |
| Bottom Right (58) | Bottom_Right_x<br>1280 | Bottom_Right_y<br>1000 | Bottom_Right_Width<br>640 | Bottom_Right_Height<br>280 | Bottom_Right_FOV<br>70 | Bottom_Right_Heading_Ang<br>387.8 |

FIG. 10

TABLE 6

Predetermined Video Display Layout (43) - BVT Layout Type 4

| | | |
|---|---|---|
| Top Viewpoint Height (45): | 1024 | Top Display Height Ratio (44): 80.00% |
| Navigation Menu (59) Height: | 40 | Navigation Menu (59) Height Ratio: 3.13% |
| Bottom Viewpoint Height (45): | 216 | Bottom Display Height Ratio (44): 16.88% |

Top Composite Video Display (51)

| Viewport Image | Viewport Positioning Cordinates (47') | | Viewport Width (46) (pixels) | Viewport Height (45) (pixels) | Viewport FOV Angle (48) (degrees) | Viewpoint Heading Angle (49) (degrees) |
|---|---|---|---|---|---|---|
| | x (pixels) | y (pixels) | | | | |
| Top Left (52) | Top_Left_x<br>0 | Top_Left_y<br>0 | Top_Left_Width<br>640 | Top_Left_Height<br>1024 | Top_Left_FOV<br>70 | Top_Left_Heading_Ang<br>35.2 |
| Top Center (53) | Top_Center_x<br>640 | Top_Center_y<br>0 | Top_Center_Width<br>640 | Top_Center_Height<br>1024 | Top_Center_FOV<br>70 | Top_Center_Heading_Ang<br>90.0 |
| Top Right (54) | Top_Right_x<br>1280 | Top_Right_y<br>0 | Top_Right_Width<br>640 | Top_Right_Height<br>1024 | Top_Right_FOV<br>70 | Top_Right_Heading_Ang<br>144.9 |

Bottom Composite Video Display (55)

| Viewport Image | Viewport Positioning Cordinates (47') | | Viewport Width (46) (pixels) | Viewport Height (45) (pixels) | Viewport FOV Angle (48) (degrees) | Viewpoint Heading Angle (49) (degrees) |
|---|---|---|---|---|---|---|
| | x (pixels) | y (pixels) | | | | |
| Bottom Left (56) | Bottom_Left_x<br>0 | Bottom_Left_y<br>1064 | Bottom_Left_Width<br>640 | Bottom_Left_Height<br>216 | Bottom_Left_FOV<br>90 | Bottom_Left_Heading_Ang<br>127.3 |
| Bottom Center (57) | Bottom_Center_x<br>640 | Bottom_Center_y<br>1064 | Bottom_Center_Width<br>640 | Bottom_Center_Height<br>216 | Bottom_Center_FOV<br>90 | Bottom_Center_Heading_Ang<br>270.0 |
| Bottom Right (58) | Bottom_Right_x<br>1280 | Bottom_Right_y<br>1064 | Bottom_Right_Width<br>640 | Bottom_Right_Height<br>216 | Bottom_Right_FOV<br>90 | Bottom_Right_Heading_Ang<br>412.8 |

FIG. 11

SYSTEMS AND METHOD FOR CAPTURING, PROCESSING AND DISPLAYING A 360° VIDEO

BACKGROUND OF THE INVENTION

Field of the Invention

The present invention is directed to a system and method for capturing, processing and displaying a 360° video, and in particular, a system and method to process a raw 360° video file such that a full 360° field of view may be viewed by a user in its entirety on a single video display screen.

Description of the Related Art

There are a number of affordable 360° video cameras on the market today, making a 360° video somewhat ubiquitous relative to just a few years ago today. While the technology required to capture 360° videos has progressed rapidly to allow this phenomenon to occur, the technology for playback and viewing such the plethora of 360° videos has not yet kept pace. Many 360° video viewers still require a user to use arrow keys or buttons, or to click and drag his or her way around a 360° video to view the various limited field of view perspectives. As is known to anyone who has attempted such maneuvering, it is easy to loose ones bearings and sense of the original direction of motion. Further, whether click and drag or using arrow keys on a computer keyboard or buttons on a mouse, this process is slow and tedious.

Further, because currently known viewers utilize a Mercator type projection, essentially stretching a 360° video around a virtual sphere, resolution is severely degraded, especially in the polar regions of the virtual sphere.

Virtual reality ("VR") headsets alleviate some of the aforementioned issues related to viewing a 360° video, such as navigation, however, VR technology brings with it its own set of drawbacks. As an initial matter, because the video screen in a VR headset is positioned mere inches away from the user's eyes causes strain, and if combined with motion of the user, for example, while riding a stationary bicycle, many users quickly become disoriented and/or nauseous. Further, the weight of the VR headset itself makes it uncomfortable for users for more than a few minutes, especially if the user is moving. It is also common for users to sweat while wearing a VR headset from more than a few minutes, in some cases, not even that, and this can result in fogging of the lenses requiring a disruption in whatever activity the user was engaged.

As such, it would be highly beneficial to provide a 360° video capture, processing and display system which allows a user to view an entire 360° panoramic view on a video display at one time. It would be further advantageous to generate a processed 360° video file which a user may view on any of a multiplicity of display platforms, such as, but not limited to a television screen, a computer monitor, a tablet computer, a smartphone, etc. Another advantage may be realized by generating a processed 360° video file which a user may view without requiring any specialized video graphics hardware or software, such as a high capacity computer processor, a high capacity video graphics card, or a VR headset. Yet one further benefit may be obtained by integrating a user application onto such a multi-platform compatible processed 360° video file.

SUMMARY OF THE INVENTION

The present invention is directed to a 360° video capture, processing and display system. In at least one embodiment, the system includes a 360° video camera to capture a 360° raw video file, and in one further embodiment, the system comprises a 360° video processing assembly to generate a plurality of 360° equirectangular geographic projections from each frame of the 360° raw video file.

In accordance with at least one embodiment of the present invention, a 360° video processing assembly includes a 360° video processing algorithm utilizing a plurality of video processing parameters to capture a plurality of viewport images from each of the plurality of 360° equirectangular geographic projections. The present system also includes a plurality of composite video displays, each composite video display having a field of view of at least 360°. In accordance with one embodiment of the present invention, each composite video display comprises a plurality of viewport images from a corresponding one of each of the plurality of 360° equirectangular geographic projection. Further, each composite video display in accordance with at least one embodiment of the present invention includes at least a top composite video display and a bottom composite video display, wherein at least one of the top composite video display or the bottom composite video display comprises a seamless integration of corresponding ones of the plurality of viewport images. A multi-platform compatible processed 360° video file comprising the plurality of composite video displays in generated, and the multi-platform compatible processed 360° video file is viewable in its entirety on a video display assembly.

The present invention is further directed to a 360° video processing system to create a multi-platform compatible processed 360° video file from a 360° raw video file which is viewable on a video display screen, wherein the system includes a 360° video processing assembly which generates a 360° equirectangular geographic projection from each frame of the 360° raw video file. In at least one embodiment, the 360° video processing assembly implements a 360° video processing algorithm utilizing a plurality of video processing parameters to capture a plurality of viewport images from each of a plurality of 360° equirectangular geographic projections.

In at least one embodiment, the present system generates a plurality of composite video displays, wherein each of the composite video displays have a field of view of at least 360°. In one further embodiment, each composite video display comprises a plurality of viewport images from a corresponding one of each of said plurality of 360° equirectangular geographic projections.

More in particular, in at least one embodiment, each composite video display includes at least one of a top composite video display comprising a top left viewport image, a top center viewport image and a top right viewport image or a bottom composite video display comprising a bottom left viewport image, a bottom center viewport image and a bottom right viewport image. Further, at least one of the top composite video display or the bottom composite video display comprises a seamless integration of corresponding ones of the plurality of viewport images.

As before, in at least one embodiment, the present 360° video processing system generates a plurality of composite video displays, wherein each of the composite video displays have a field of view of at least 360°. In one further embodiment, each composite video display comprises a plurality of viewport images from a corresponding one of each of said plurality of 360° equirectangular geographic projections.

At least one embodiment of the present invention is directed to a method for capturing, processing and displaying a 360° video on a video display screen, wherein the method includes: capturing a 360° video; generating a plurality of 360° equirectangular geographic projections; selecting one or more of a plurality of video processing parameters, wherein the video processing parameters include a predetermined video display layout, a display height ratio, a viewport field of view angle, and a viewport heading angle; capturing a plurality of viewport images from each of the plurality of 360° equirectangular geographic projections utilizing the one or more video processing parameters; generating a top composite video display from corresponding ones of the plurality of viewport images from each of the plurality of 360° equirectangular geographic projection: generating a bottom composite video display from corresponding ones of the plurality of viewport images from each of the plurality of 360° equirectangular geographic projection; combining the top composite video display and the bottom composite video display from each of the plurality of 360° equirectangular geographic projection to form a composite video display having a field of view of at least 360°; and creating a multi-platform compatible processed 360° video file comprising a plurality of composite video displays, wherein the multi-platform compatible processed 360° video file is viewable on the video display screen.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 8 is a table comprising an illustrative embodiment of a plurality of video processing parameters corresponding to a predetermined video display layout designated as BVT Layout Type 1 in accordance with the present invention.

FIG. 9 is a table comprising an illustrative embodiment of a plurality of video processing parameters corresponding to a predetermined video display layout designated as BVT Layout Type 2 in accordance with the present invention.

FIG. 10 is a table comprising an illustrative embodiment of a plurality of video processing parameters corresponding to a predetermined video display layout designated as BVT Layout Type 3 in accordance with the present invention.

FIG. 11 is a table comprising an illustrative embodiment of a plurality of video processing parameters corresponding to a predetermined video display layout designated as BVT Layout Type 4 in accordance with the present invention.

Like reference numerals refer to like parts throughout the several views of the drawings.

DETAILED DESCRIPTION

Figure 1:
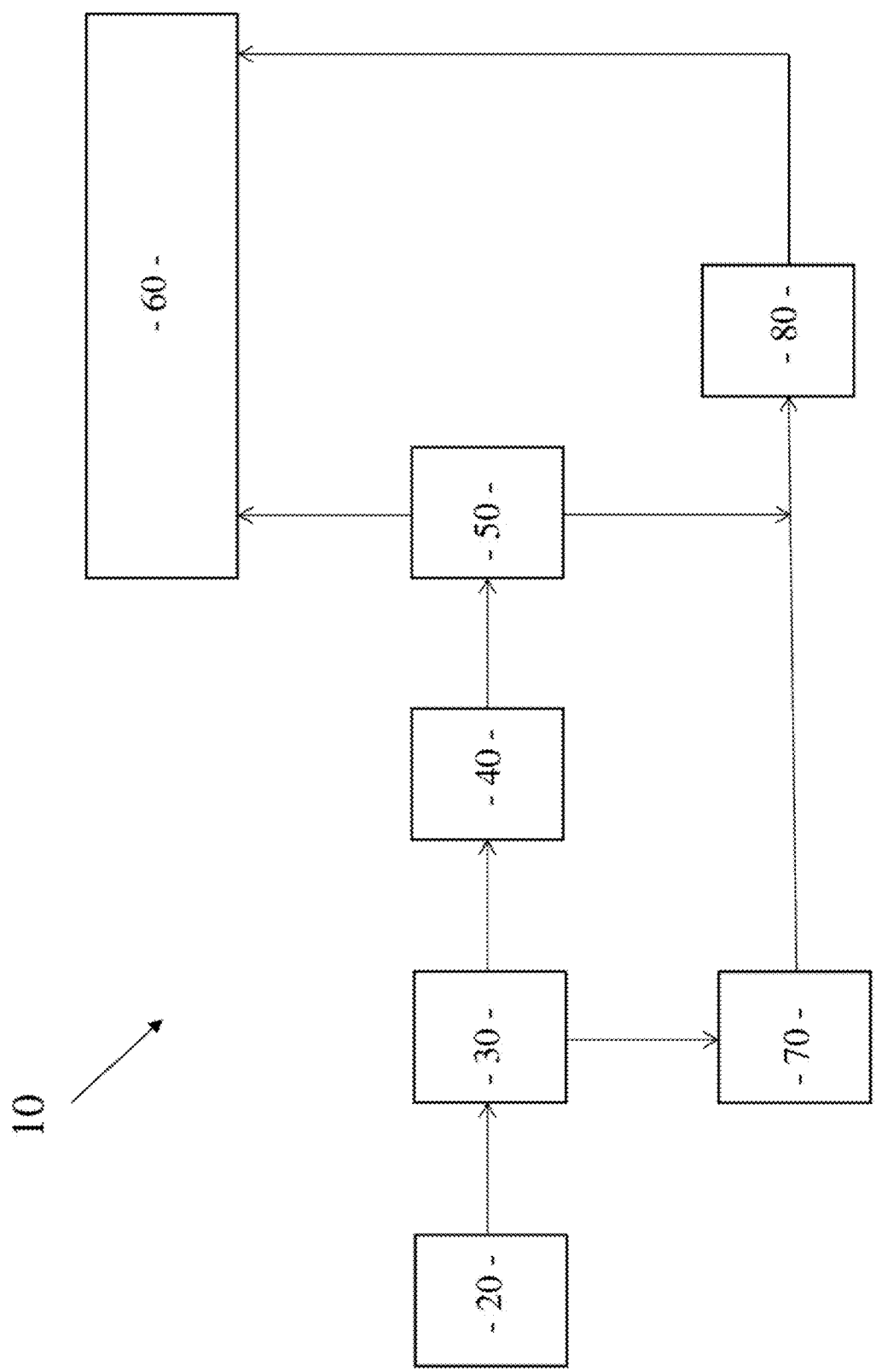
FIG. 1 is a schematic representation of one illustrative embodiment of a 360° video capture, processing and display system in accordance with the present invention.

In accordance with one embodiment, the present invention is directed to a 360° video capture, processing and display system, generally as shown as 10 throughout the figures. With reference to the illustrative embodiment of FIG. 1, the present system 10 includes a 360° video capture assembly 20. With additional reference to FIG. 2, a 360° video capture assembly 20 in accordance with the present invention comprises a 360° video camera 22. A wide variety of 360° video cameras 22 are available today ranging from inexpensive hobbyist 360° video cameras 22 to high end professional 360° video cameras 22. It is within the scope and intent of the present invention to utilize any type of 360° video camera 22 capable of generating a raw 360° video file 26 of a target scene.

A 360° video capture assembly 20 in accordance with at least one embodiment of the present system 10 further comprises a 360° video camera transport 24. As shown in the illustrative embodiment of FIG. 2, a 360° video capture assembly 20 in accordance with the present invention may further comprise a video camera support 23 in order to secure a 360° video camera 22 to a 360° video camera transport 24.

As will be appreciated by those of skill in the art, a 360° video camera transport 24 in accordance with one embodiment of the present system 10 may comprise any of a plurality of transport devices including but in no manner limited to a manned vehicle such as a bicycle, tricycle, scooter, skateboard, motorcycle, automobile, airplane, helicopter, boat, kayak, submarine, surfboard, paddleboard, rocket, etc., in order to transport a 360° video camera 22 while generating a raw 360° video file of a target scene. In accordance with at least one other embodiment of the present system 10, a 360° video camera transport 24 may comprise, but is in no manner limited to, an unmanned vehicle such as a remote controlled bike, car, plane, drone, boat, submarine, rocket, etc., once again, in order to transport a 360° video camera 22 during generation of a raw 360° video file of a target scene.

Alternatively, a 360° video camera 22 of a 360° video transport capture assembly 20 in accordance with at least one embodiment of the present invention may be simply handheld by a user as he or she walks or is otherwise transported through a target scene. In one further embodiment, a body camera type mount may be used to attach a 360° video camera 22 to a person as he or she is transported through a target scene. In one further embodiment, a body camera type mount may be used to attach a 360° video camera 22 to an animal, such that the 360° video camera 22 generates a raw 360° video file along and through the course of the animal's travels. As will be appreciated, animals ranging from cats, dogs, elephants, lions, birds, dolphins, manatees, whales, sharks, etc., just to name a few, may be utilized to "transport" a 360° video camera 22 while generating a raw 360° video file along and through the course of its travels.

As will be further appreciated by those of skill in the art, currently available 360° video cameras 22 are generally capable of capturing a raw 360° video file 26 in 4K resolution, and more specifically, a resolution of either 4096× 2160 pixels or 3840×2160 pixels. It is anticipated that 360° video cameras 22 in the immediate future will be capable of capturing raw 360° video files 26 in 8K resolution, 16K resolution, 32K resolution, etc., and it remains within the scope and intent of the present invention to utilize raw 360° video files 26 having such higher resolutions and beyond.

Figure 4:
FIG. 4 is a screen shot of one frame of a raw 360° video file in equirectangular video format in accordance with the present invention.

In accordance with at least one embodiment, a 360° video camera 22 will generate a raw 360° video file 26 in an equirectangular 360° video format 37, such as is shown in the illustrative embodiment of FIG. 4. Alternatively, a 360° video processing algorithm 36 is employed, at least partially, to convert a raw 360° video file 26, such as, a fisheye 360° video format or dual fisheye 360° video format, into an equirectangular 360° video format 37.

Figure 2:
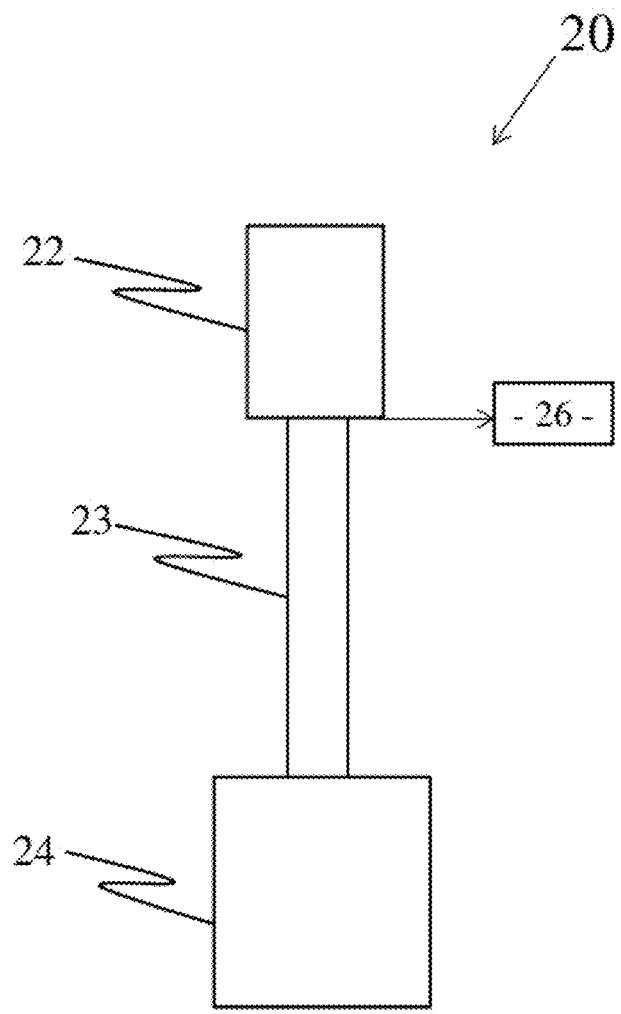
FIG. 2 is a schematic representation of one illustrative embodiment of a 360° video capture assembly in accordance with the present invention.
Figure 3:
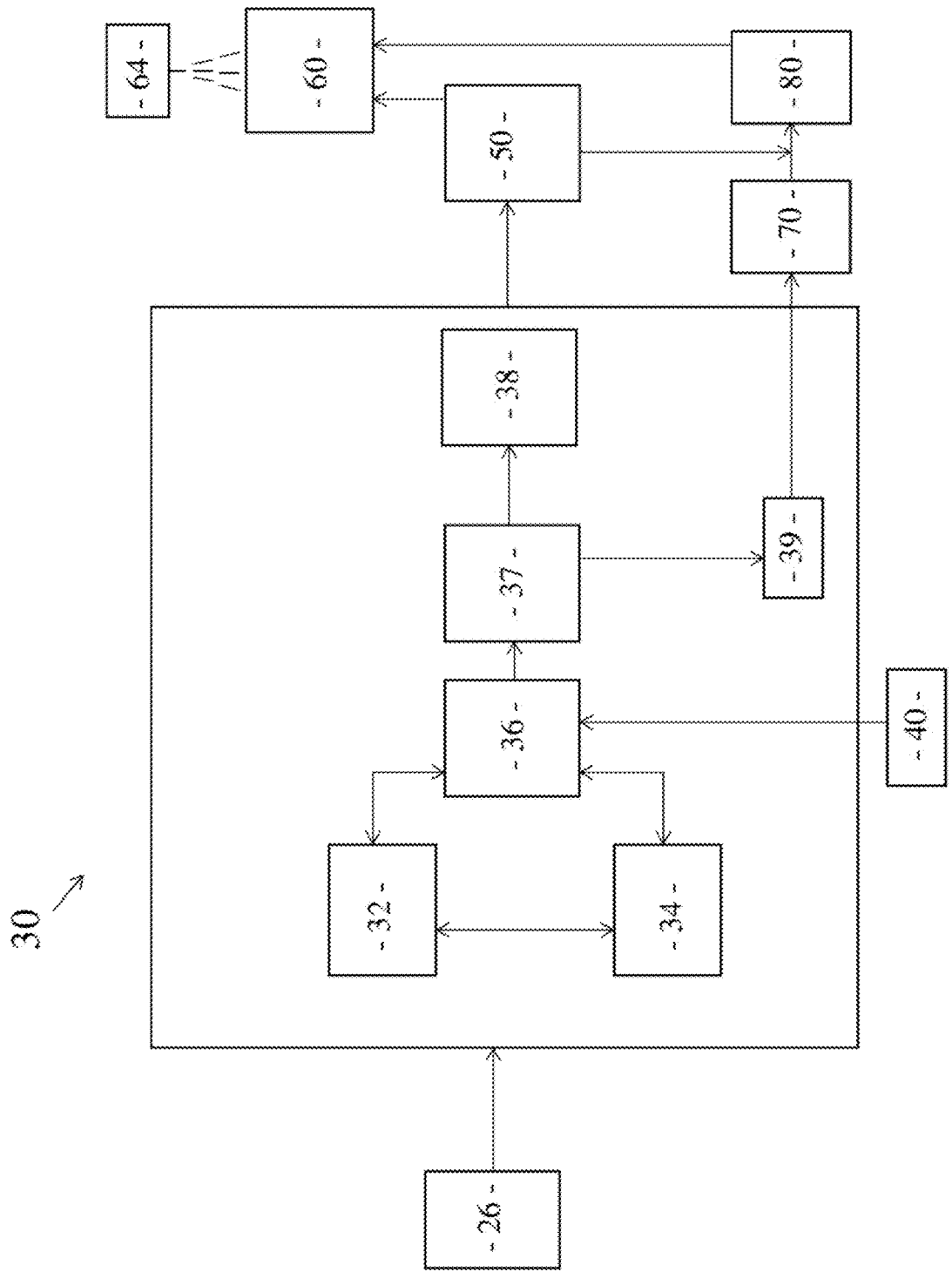
FIG. 3 is a schematic representation of one illustrative embodiment of a 360° video processing assembly in accordance with the present invention.

Looking once again to the illustrative embodiment of a 360° video capture, processing and display system 10 is shown in FIG. 1, the system 10 further comprises a 360° video processing assembly 30. FIG. 3 is a schematic representation of one illustrative embodiment of a 360° video processing assembly 30 in accordance with the present invention. As may be seen from the illustrative embodiment of FIG. 3, the primary input to the 360° video processing assembly 30 is a raw 360° video file 26. A plurality of video processing parameters 40, discussed in greater detail hereinafter, are also input to a 360° video processing algorithm 36 of a 360° video processing assembly 30 in accordance with at least one embodiment of the present invention.

The illustrative embodiment of a 360° video processing assembly 30 as shown in FIG. 3 includes a high-capacity computer processor 32 which is disposed in a communicative relation with a high-capacity video graphics card 34.

As will be appreciated by those of skill in the art, the specifications presented in Table 1 below are exemplary of a high-capacity computer processor 32 which may be utilized in a 360° video processing assembly 30 in accordance with the present invention.

TABLE 1

| Description | Specification |
| --- | --- |
| GPU: | GeForce RTX 2080 OC 8GB |
| CPU: | Core i7-9700K (4.6GHz Overclocked) |
| Motherboard: | MicroATX Z370 |
| RAM: | HyperX 32GB DDR4 2933MHz (2 X 16GB) |
| Storage: | 512GB PCIe NVMe M.2 SSD, 2TB 7200 RPM SATA HDD |
| PSU: | Alienware 850 Watt Multi-GPU PSU |
| CPU Cooling: | Alienware High Performance Liquid Cooling System |
| Core i9-9900K | Core i7-9700K |
| Architecture: | Coffee Lake |
| Socket: | 1151 |
| Cores / Threads: | 8/16 |
| Base Frequency (GHz): | 3.6 |
| Boost Frequency (Active Cores - GHz): | 1-2 Cores - 5.0 4 Cores - 4.8 8 Cores - 4.7 |
| L3 Cache: | 16MB |
| Process: | 14nm++ |
| TDP: | 95W |
| Memory Speed: | DDR4-2666 |
| Memory Controller: | Dual-Channel |
| PCIe Lanes: | x16 |
| Integrated UHD Graphics GT2 (Base/Boost MHz): | 350/1200 |

As will also be appreciated by those of skill in the art, the specifications presented in Table 2 below are exemplary of a high-capacity video graphics card 34 which may be utilized in a 360° video processing assembly 30 in accordance with the present invention.

TABLE 2

| GEFORCE RTX 2080 FOUNDERS EDITION - Reference Product Specs: |
| --- |
| GPU Engine Specs: |
| 29442944 NVIDIA CUDA ® Cores 57T60 TRTX-OPS 88 Giga Rays/s 17101800 (OC) Boost Clock (MHz) 15151515 Base Clock (MHz) |
| Memory Specs: |
| 14 Gbps Memory Speed 8 GB GDDR68 GB GDDR6 Standard Memory Configuration |

TABLE 2-continued

GEFORCE RTX 2080 FOUNDERS EDITION -
Reference Product Specs:

256-bit Memory Interface Width
448 GB/s Memory Bandwidth (GB/sec)

With continued reference to the 360° video processing assembly 30 as shown in FIG. 3, the high-capacity computer processor 32 and the high-capacity video graphics card 34 are disposed in an operative communication with a 360° video processing algorithm 36. Following this Detailed Description in the present specification is an exemplary portion of a 360° video processing algorithm 36 in accordance with at least one embodiment of the present invention.

Figure 5:
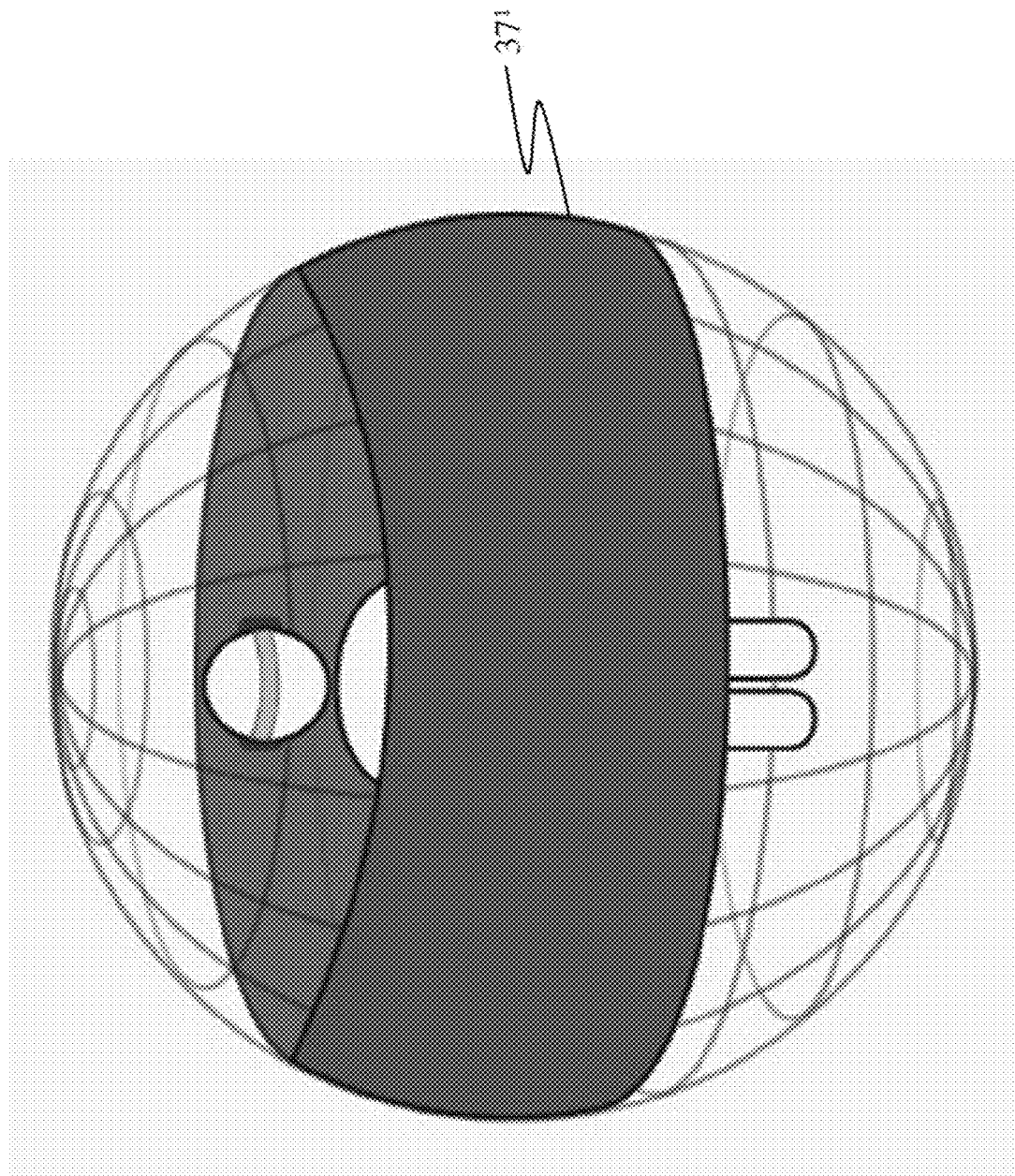
FIG. 5 is a schematic representation of one embodiment of an equirectangular geographic projection in accordance with the present invention.

In at least one embodiment, the 360° video processing algorithm 36 operates to convert a raw 360° video file 26 into an equirectangular 360° video format 37, once again, as shown in the illustrative embodiment of FIG. 4. In at least one further embodiment, the 360° video processing algorithm 36 operates to generate an equirectangular 360° geographic projection 37', such as is shown by way of example in the illustrative embodiment of FIG. 5, from each frame of the raw 360° video file 26 in an equirectangular 360° video format 37.

Figure 6:
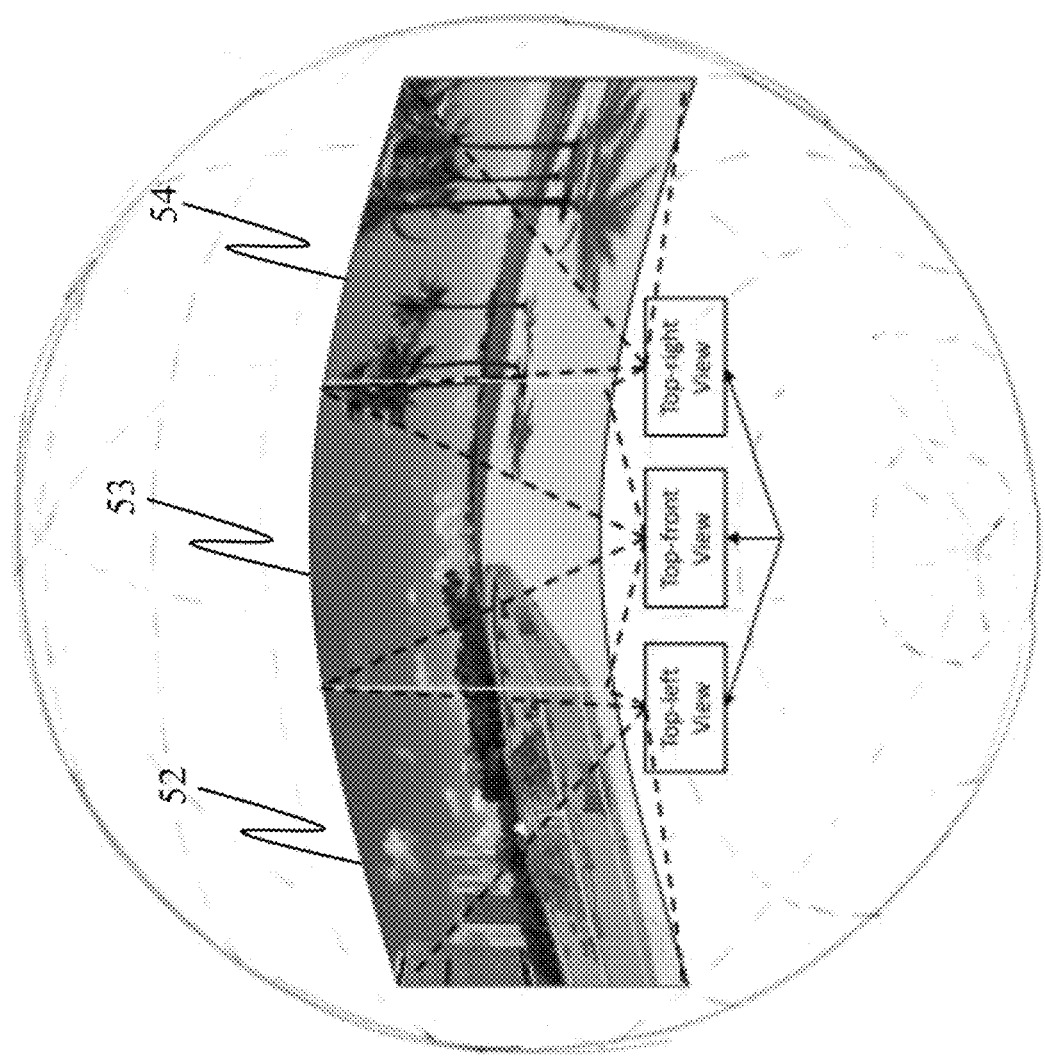
FIG. 6 is a schematic representation of one embodiment of capturing a plurality of viewport images from an equirectangular geographic projection in accordance with the present invention.
Figure 7:
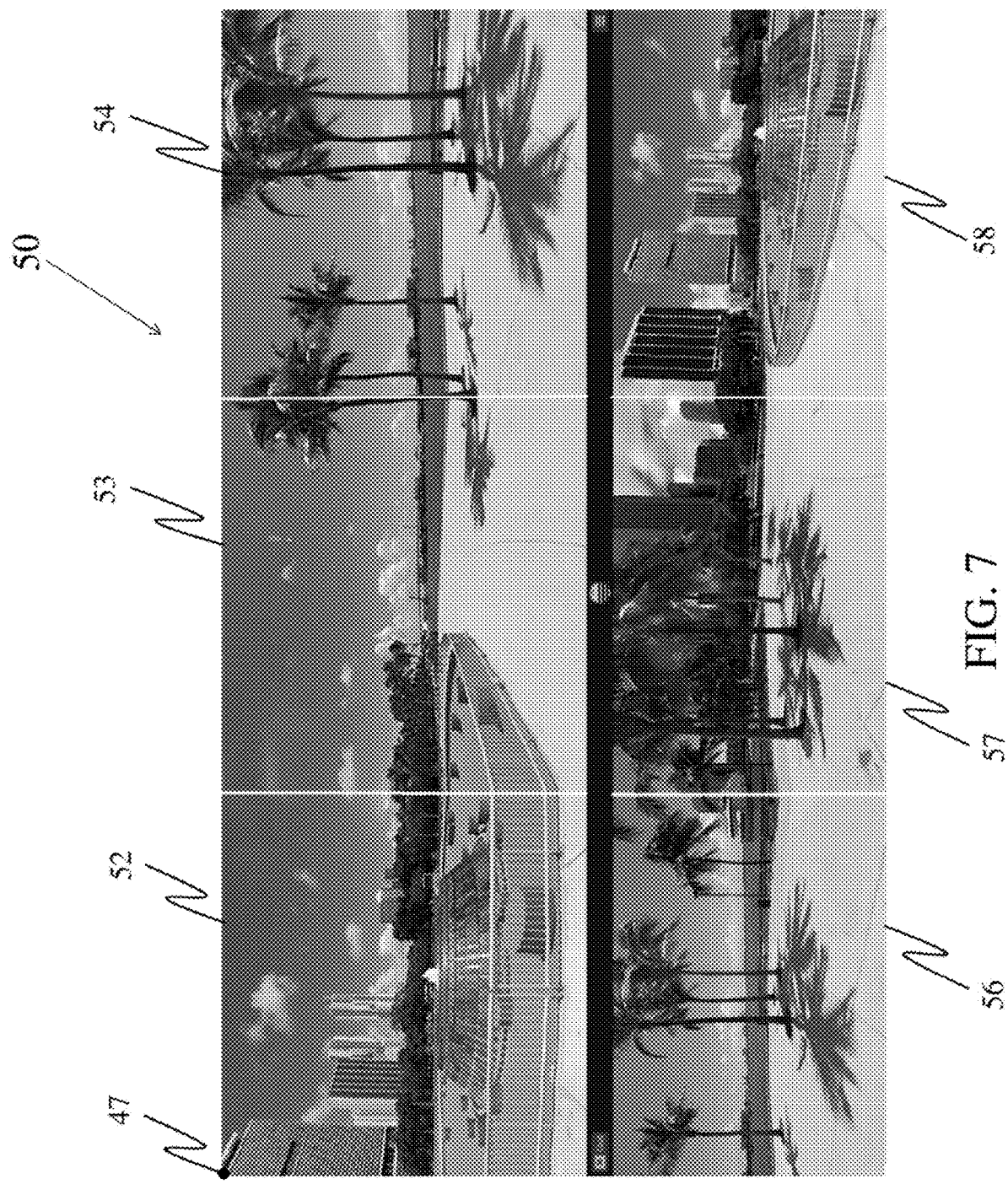
FIG. 7 is a schematic representation of one illustrative embodiment of a plurality of viewport images comprising a composite video display in accordance with the present invention.

As stated above, the present 360° video capture, processing and display system 10 further comprises a plurality of video processing parameters 40. More in particular, in at least one embodiment, the plurality of video processing parameters 40 are utilized by the 360° video processing algorithm 36 to precisely define each of a plurality of viewport images 52, 53, 54 and 56, 57, 58 to be captured from an equirectangular 360° geographic projection 37' for each frame of a raw 360° video file 26. FIGS. 6 and 7 are illustrative of a plurality of viewport images 52, 53, 54 and 56, 57, 58 captured from a single equirectangular 360° geographic projection 37' of a raw 360° video file 26 in an equirectangular 360° video format 37.

In at least one embodiment, the video processing assembly 30 captures each of a plurality of viewport images 52, 53, 54 and 56, 57, 58 from each 360° equirectangular geographic projection 37' at a rate of about thirty frames per second. In at least one further embodiment, the video processing assembly 30 captures each of a plurality of viewport images 52, 53, 54 and 56, 57, 58 from each 360° equirectangular geographic projection 37' at a rate of about sixty frames per second. As will be appreciated by those of skill in the art, the capture rate, whether thirty frames per second or sixty frames a second, is a function of the current state of the art in video processing, however, it is understood to be within the scope and intent of the present invention to employ capture rates that are less than thirty frames per second or that are greater than sixty frame per second, and which may be substantially greater than sixty frame per second.

The plurality of video processing parameters 40 in accordance with at least one embodiment of a 360° video processing assembly 30 in accordance with the present invention includes a target display width 42 and a target display height 41. In at least one embodiment, a target display width 42 and a target display height 41 are expressed in terms of a number of pixels.

In accordance with at least one further embodiment of a 360° video processing assembly 30 in accordance with the present invention, the plurality of video processing parameters 40 include a plurality of predetermined video display layouts 43. Each predetermined video display layout 43 is at least partially defined by a display height ratio 44. More in particular, a display height ratio 44 is at least partially defined as a height 45 of a viewport image 52, 53, 54 and 56, 57, 58 divided by the target display height 41, with the quotient multiplied by 100. As one example, for a predetermined video display layout 43 designated as BVT Layout Type 1, a display height ratio 44 is calculated to be 58.98%. This display height ratio 44 is obtained by dividing a top viewport height 45 of 755 pixels by a target display height of 1280 pixels, and multiplying the quotient by 100.

In addition to a display height ratio 44 and a viewport height 45, the plurality of video processing parameters 40 in accordance with at least one embodiment of a 360° video processing assembly 30 include a viewport width 46, viewport origin coordinates 47, viewport positioning coordinates 47', a viewport field-of-view angle 48, and/or a viewport center heading angle 49.

Tables 3 through 6 presented in FIGS. 8 through 11, respectively, assign specific video processing parameters 40 for each of a plurality of predetermined video display layouts 43 designated as BVT Layout Types 1 through 4, respectively, in accordance with at least one embodiment of the present 360° video capture, processing and display system 10 of the present invention. Each of the examples in Tables 3 through 6 are based on a target display width 42 of 1920 pixels and a target display height 41 of 1280 pixels.

Turning next to the illustrative embodiment of FIG. 8, Table 3 assigns the specific video processing parameters 40 for a predetermined video display layout 43 designated as BVT Layout Type 1. Once again, the plurality of video processing parameters 40 presented in Tables 3 through 6 are based on a target display width of 1920 pixels and a target display height 41 of 1280 pixels. As such, Table 3 assigns a top viewport height 45 of 755 pixels, which corresponds to a top display height ratio 44 of 58.98%, calculated as shown above. Table 3 further assigns a bottom viewport height 45 of 485 pixels, which corresponds to a bottom display height ratio 44 of 37.89%. The remaining 40 pixels of the target display height 41 are utilized to display a navigation menu 59.

Table 3 further assigns a viewport width 46 of 640 pixels for each of viewport images 52, 53, 54 and 56, 57, 58. Likewise, Table 3 assigns a viewport field-of-view angle 48 of 70° for each of viewport images 52, 53, 54 and 56, 57, 58. Looking again to the plurality of video processing parameters 40 in Table 3, viewport positioning coordinates 47' are assigned for each of viewport images 52, 53, 54 and 56, 57, 58. In at least one embodiment of the present invention, viewport positioning coordinates 47' are expressed as x, y coordinates at the uppermost left-hand corner of the corresponding viewport image 52, 53, 54 and 56, 57, 58, and are measured in pixels from viewport origin coordinates 47. More in particular, viewport origin coordinates 47 are expressed as x=0 pixels and y=0 pixels, with the viewport origin coordinates 47 located at the uppermost left-hand corner of a composite video display 50, such as is shown by way of example in the illustrative embodiments of FIGS. 7 and 12.

Looking further to the plurality of video processing parameters 40 in Table 3 in FIG. 8, for a predetermined video display layout 43 designated as BVT Layout Type 1, top left viewport image 52 is assigned viewport positioning coordinates 47' wherein x=0 pixels and y=0 pixels; top center viewport image 53 is assigned viewport positioning coordinates 47' wherein x=640 pixels and y=0 pixels; and, top right viewport image 54 is assigned viewport positioning coordinates 47' wherein x=1280 pixels and y=0 pixels.

Lastly, Table 3 assigns a viewport center heading angle 49 for each of viewport images 52, 53, 54 and 56, 57, 58. It is noteworthy from a review of Tables 3 through 6 presented in FIGS. 8 through 11, respectively, that the viewport center heading angle 49 for each of the top left viewport image 52, top right viewport image 54, bottom left viewport image 56, and a bottom right viewport image 58 are completely unique for each of the plurality of predetermined video display layouts 43. As may also be seen from Tables 3 through 6, the viewport center heading angle 49 for each of the top center viewport image 53 and the bottom center viewport image 57, are 90° and 270°, respectively.

Application of the plurality of video processing parameters 40 in Table 3 of FIG. 8 by a 360° video processing assembly 30 in accordance with the present invention results in the capture of a plurality of top viewport images 52, 53 and 54 and bottom viewport images 56, 57 and 58, such as is shown by way of example in the illustrative embodiment of FIG. 7. More importantly, application of the specific plurality of video processing parameters 40 of Table 3 to an equirectangular 360° geographic projection 37' of the equirectangular 360° video format 37 frame as shown in the illustrative embodiment of FIG. 4 results in the creation of the composite video display 50, as shown by way of example in the illustrative embodiment of FIG. 12.

Figure 12:
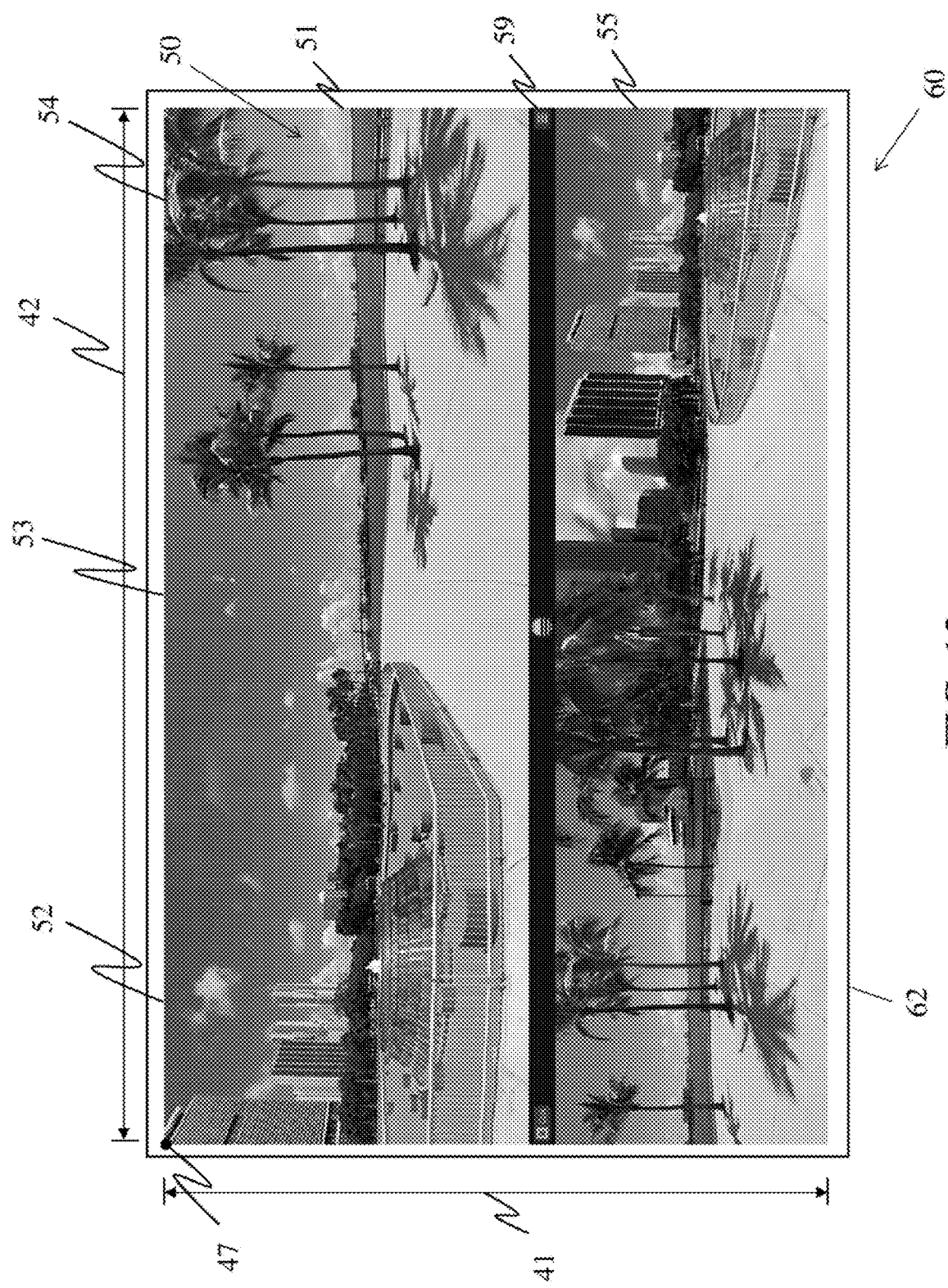
FIG. 12 is a screen shot of one illustrative embodiment of a composite video display corresponding to a predetermined video display layout designated as BVT Layout Type 1 in accordance with the present invention.

It is noteworthy, as may be seen from the illustrative embodiment of FIG. 12 that the present 360° video processing assembly 30 creates a top composite video display 51 comprising a seamless integration of corresponding ones of the top left viewport image 52, top center viewport image 53 and top right viewport image 54. Similarly, as may also be seen from the illustrative embodiment of FIG. 12, the present 360° video processing assembly 30 creates a bottom composite video display 55 comprising a seamless integration of corresponding ones of the bottom left viewport image 56, bottom center viewport image 57 and bottom right viewport image 58.

It is further noteworthy that in accordance with at least one embodiment of the present 360° video capture, processing and display system 10, a composite video display 50 comprising an entire 360° field of view is completely displayed at one time on a video display assembly 60. In fact, and with further reference to the illustrative embodiment of FIG. 12, the composite video display 50 comprising a composite field of view which is greater than 360° is completely displayed at one time on a flat video display screen 62 of a video display assembly 60 in accordance with the present invention. More in particular, in accordance with the plurality of video processing parameters 40 as shown in Table 3 of FIG. 8, each of the top viewport images 52, 53 and 54 and the bottom viewport images 56, 57, and 58 comprise a viewport field of view angle 48 of 70°. As such, each of top composite video display 51 and bottom composite video display 55 a top or bottom composite field of view of view of 210°, respectively. It of course follows that composite video display 50 comprises a composite field of view of 420°. It is believed that the composite video display 50 having a composite field of view of 360° or greater displayed on a flat video display screen 62 of a video display assembly 60 in accordance with the present invention is heretofore unknown. As will be appreciated, a video display assembly 60 in accordance with at least one embodiment of the present invention may comprise a curved video display screen 62.

As will be appreciated by those of skill in the art, by capturing and compiling a plurality of viewport images 52, 53, 54 and 56, 57, 58 for each of a plurality of successive frames of a raw 360° video file to create a plurality of composite video displays 50, a processed 360° video file may be created. More in particular, and in accordance with at least one embodiment of the present invention, the video processing assembly 30 is utilized to create a multi-platform compatible processed video file 38, as shown in the illustrative embodiment of FIG. 3. Specifically, a multi-platform compatible processed video file 38 may be in any of a number of common video file formats including, but in no manner limited to, "mp4", "mov", "avi", etc. As such, a multi-platform compatible processed video file 38 created in accordance with the present invention comprises a plurality of composite video displays 50 which are viewable on any of a number of video display assembly 60 platforms including, but in no manner limited to, high definition televisions, standard resolution televisions, computers monitors, laptops, tablets, smartphones screens, etc., just to name a few, without the need for any specialized video graphics hardware or software.

In at least one embodiment, the resultant multi-platform compatible processed video file 38 is output in HD resolution, i.e., about half of the resolution of a raw 360° video file, at a rate of about thirty frames per second to about sixty frames per second. Of course, it will be appreciated by those of skill in the art, as higher resolution raw 360° video files become more readily available, higher resolution multi-platform compatible processed video files 38 may be created utilizing the present video capture, processing and display system 10. More in particular, as a result of the data compression that occurs utilizing a 360° video processing assembly 30 in accordance with the present system 10, the resulting multi-platform compatible processed video files 38 may be displayed with greater resolution than that which may be obtained utilizing currently known 360° video viewing platforms such as, by way of example, Google Streetview, YouTube 360° video, VIRB 360° Video Player, or GoPro Video Player, just to name a few.

It is further noteworthy, that as a result of capturing a plurality of viewport images 52, 53, 54, and/or 56, 57, 58, which in total comprise only a portion of the data of a frame of a raw 360° video file 26 image file utilized to generate an equirectangular 360° geographic projection 37'. More in particular, the north and south polar regions of the equirectangular 360° geographic projection 37' are not utilized while capturing a plurality of viewport images 52, 53, 54, and/or 56, 57, 58, as may be seen from the illustrative embodiment of FIG. 6, and therefore, a multi-platform compatible processed video files 38 created in accordance with the present invention comprises a file size that is considerably smaller than that of the raw 360° video file 26 from which it was generated. In accordance with at least one embodiment of the present 360° video capture, processing and display system 10, a multi-platform compatible processed video files 38 comprises a file size which is approximately four times less than that of the raw 360° video file 26 from which it was generated.

Figure 13:
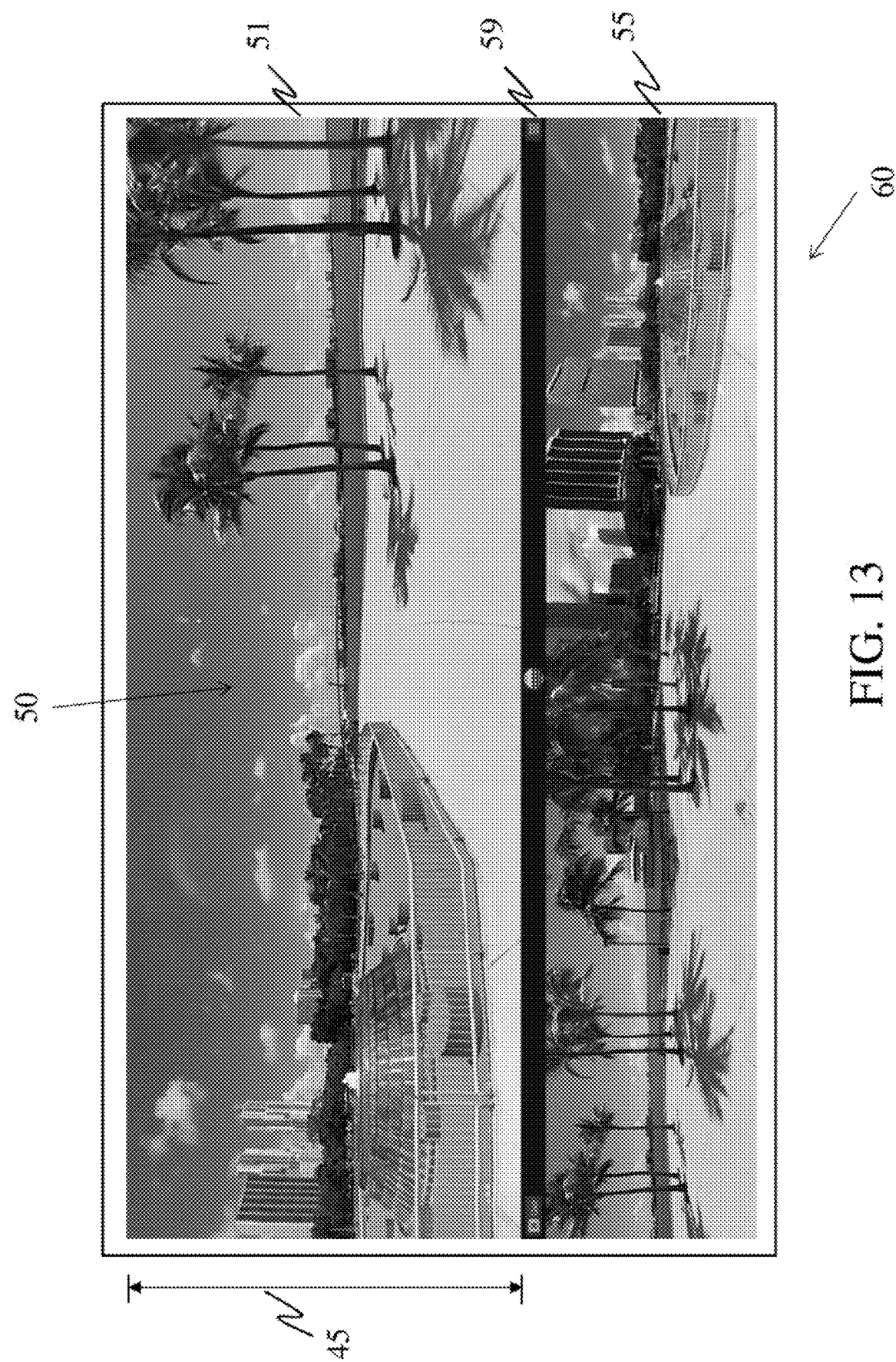
FIG. 13 is a screen shot of one illustrative embodiment of a composite video display corresponding to a predetermined video display layout designated as BVT Layout Type 2 in accordance with the present invention.
Figure 14:
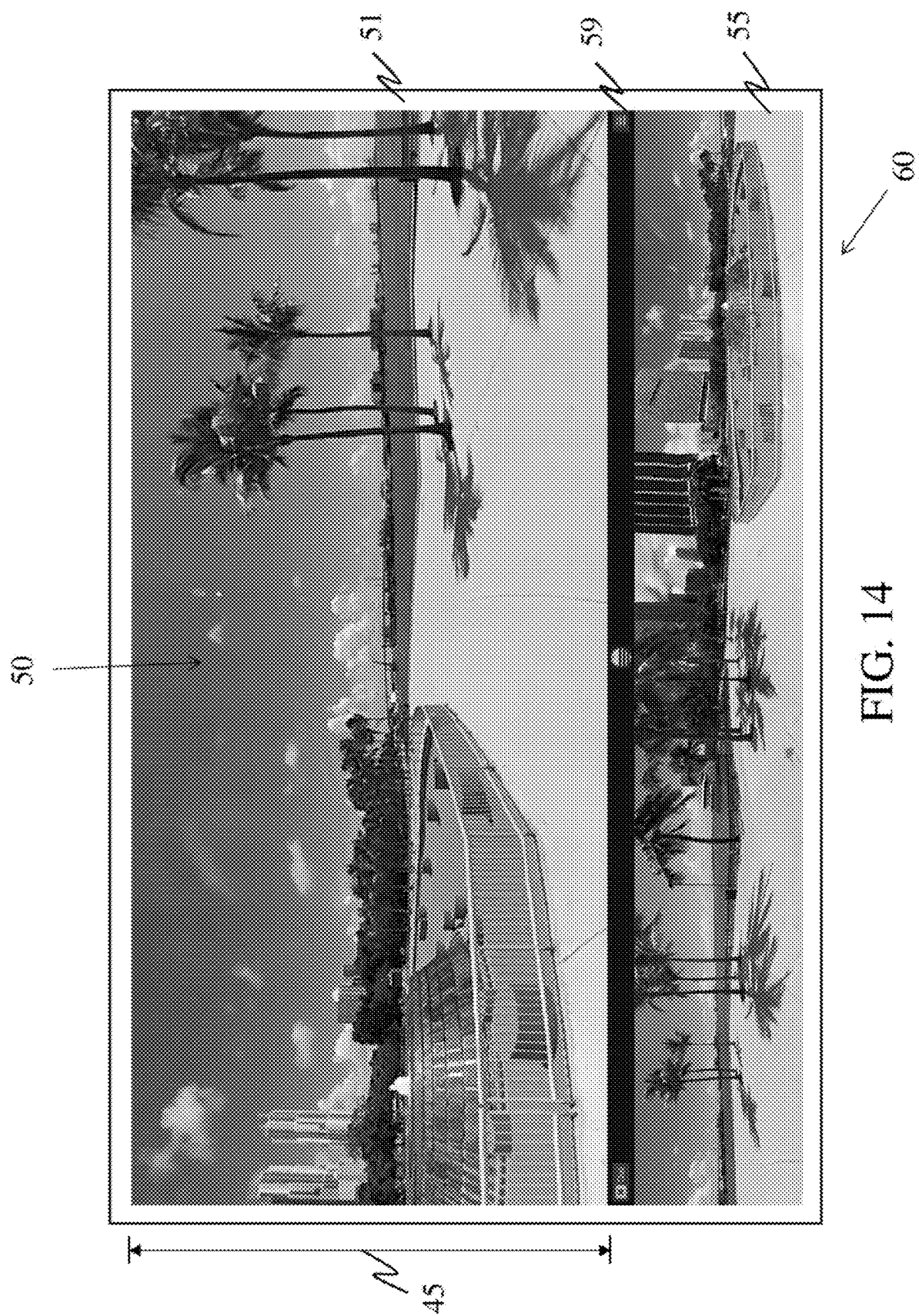
FIG. 14 is a screen shot of one illustrative embodiment of a composite video display corresponding to a predetermined video display layout designated as BVT Layout Type 3 in accordance with the present invention.

Turning next to the illustrative embodiment of FIG. 13, application of the specific plurality of video processing parameters 40 of Table 4 as shown in FIG. 9 to an equirectangular 360° geographic projection 37' of the single equirectangular 360° video format 37 frame as shown in the illustrative embodiment of FIG. 4 results in the composite video display 50 as shown in the illustrative embodiment of FIG. 13. Similarly, application of the specific plurality of video processing parameters 40 of Table 5 as shown in FIG. 10 to an equirectangular 360° geographic projection 37' of the single equirectangular 360° video format 37 frame as shown in the illustrative embodiment of FIG. 4 results in the composite video display 50 as shown in the illustrative embodiment of FIG. 14.

Figure 15:
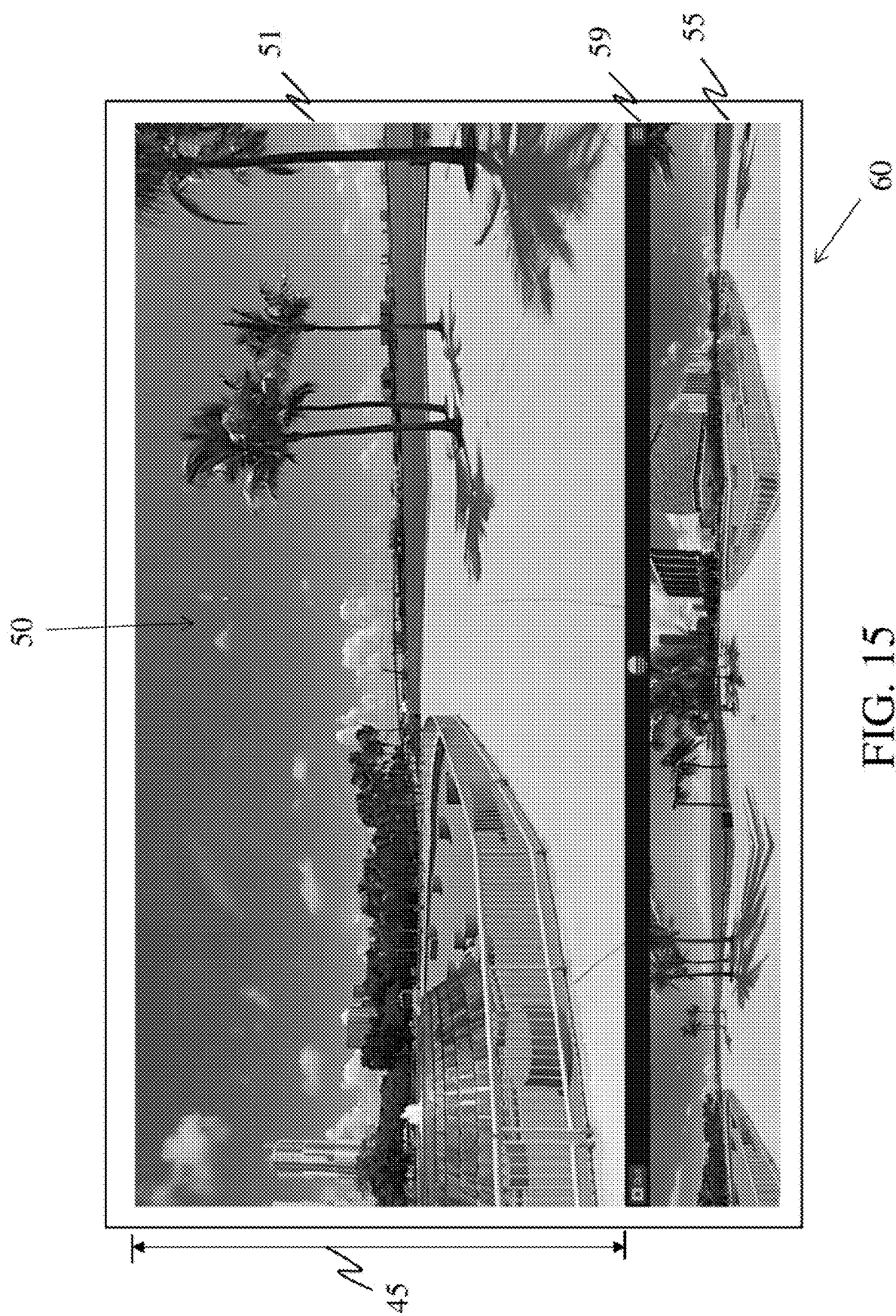
FIG. 15 is a screen shot of one illustrative embodiment of a composite video display corresponding to a predetermined video display layout designated as BVT Layout Type 4 in accordance with the present invention.
Figure 16:
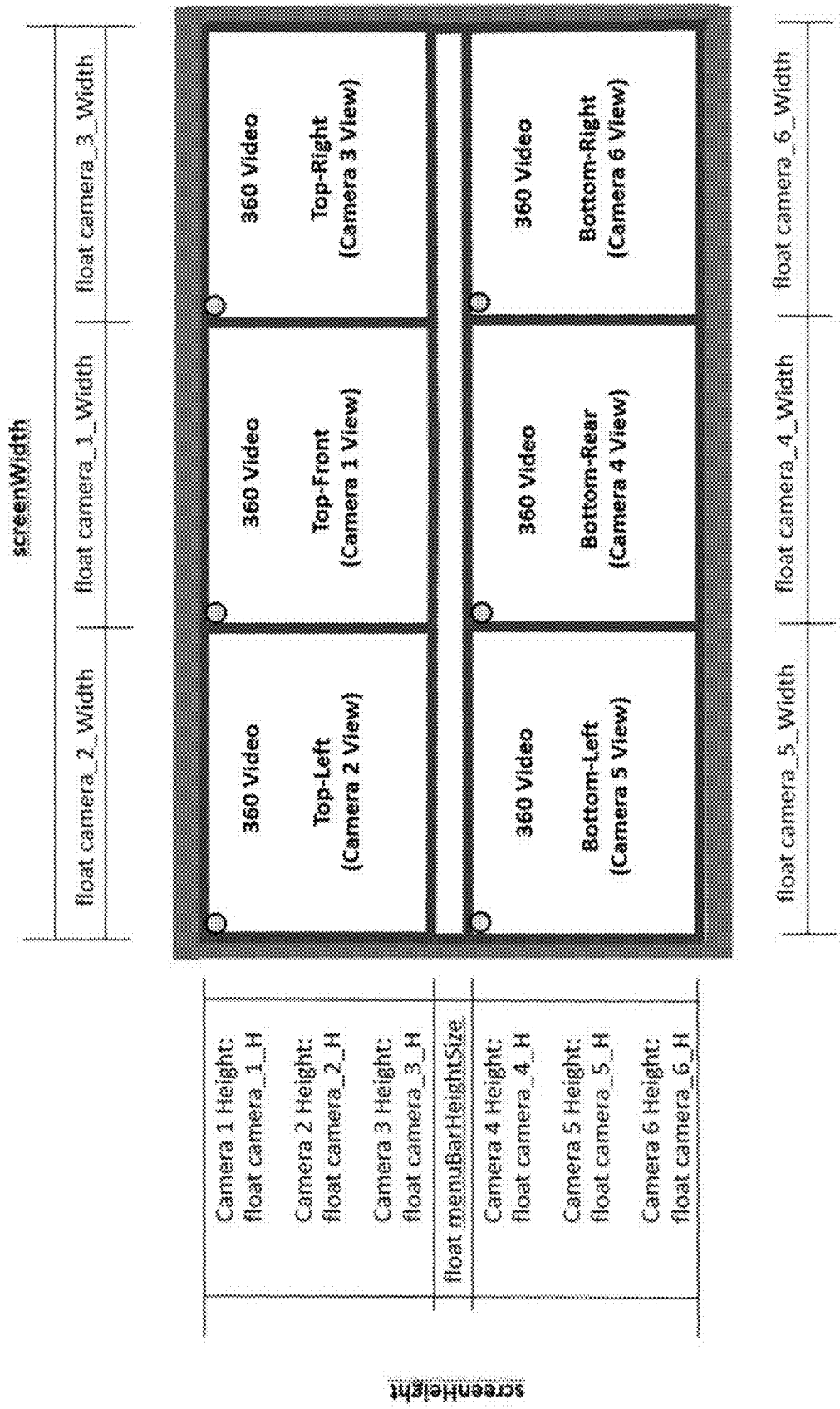
FIG. 16 is a schematic representation of a composite video display identifying at least some of the variables utilized in the illustrative embodiment of the portion of a 360° video processing algorithm in accordance with the present invention.
Figure 17:
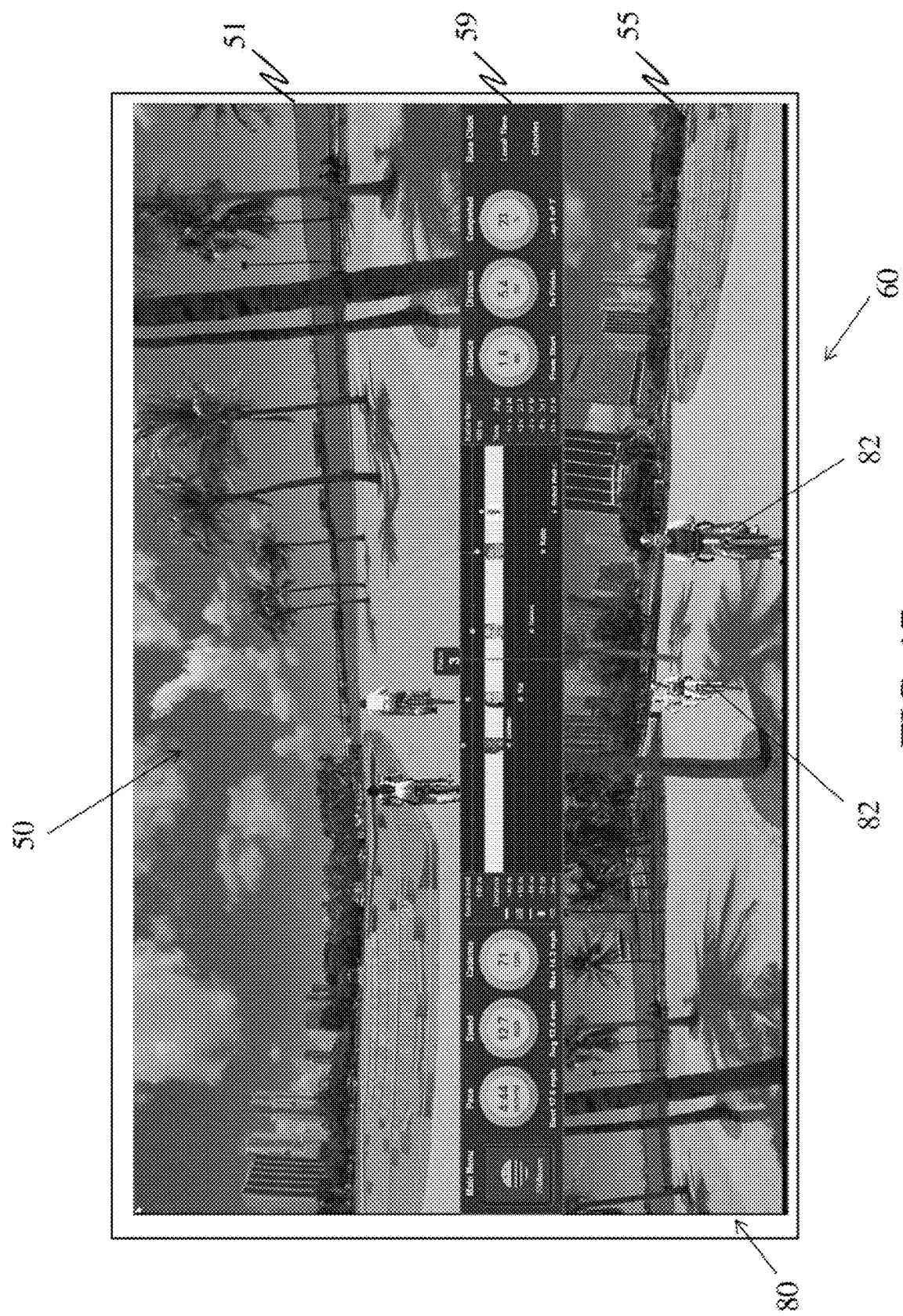
FIG. 17 is a screen shot illustrative of one embodiment of an application module incorporating a multi-platform compatible processed 360° video file in accordance with the present invention.

Additionally, application of the specific plurality of video processing parameters 40 of Table 6 as shown in FIG. 11 to an equirectangular 360° geographic projection 37' of the single equirectangular 360° video format 37 frame as shown in the illustrative embodiment of FIG. 4 results in the composite video display 50 as shown in the illustrative embodiment of FIG. 15. As may be seen from Table 6 in FIG. 11, the viewport field of view angle 48 assigned to each of the bottom left viewport image 56, bottom center viewport image 57 and bottom right viewport image 58 is 90°. As such, bottom composite video display 55 in the illustrative embodiment of FIG. 14 comprises a bottom composite field of view of 270°, and further, composite video display 50 in the illustrative embodiment of FIG. 14 comprises a composite field of view of 480°. As will be appreciated by those of skill in the art, in at least one embodiment, the present system 10 may be utilized to generate a composite video display 50 having a field of view of less than 360°.

Turning once again to the 360° video processing assembly 30 as shown in the illustrative embodiment of FIG. 3, a geographical positioning coordinate file 39 may be generated in conjunction with the creation of a multi-platform compatible 360' video file 38. The geographical positioning coordinate file includes geographical positioning coordinates which correspond to each of a plurality of captured viewport images, and may include at least a latitude, longitude, and a heading angle in which the lens of the 360° video camera was directed at the time each frame of a raw 360° video was recorded.

In at least one embodiment, a geosynchronization module 70 disposed in communication with a video processing assembly 30 correlates the data in a geographical positioning coordinate file 39 to each of the plurality of captured viewport images corresponding to each frame of a raw 360° video file.

As further shown in the illustrated embodiment of FIG. 3, the present 360° video capture, processing and display system 10 may include a user application module 80. More in particular, an application module 80 is operable to integrate a user application onto a multi-platform compatible 360' video file 38. As discussed hereinafter, there are any number of user applications which may benefit from integration with a with a multi-platform processed 360° video file 38 in accordance with the present invention including but not limited to racing, touring, exploring, travelogues, movies, real estate, inspections, engineering, surveying, drone videography, security, surveillance, law enforcement and military applications.

FIGS. 17 through 21 are illustrative of one example of a user application module 80 integrated onto a composite video display 50 of a multi-platform processed 360° video file 38 in accordance with the present invention. More in particular, the illustrative embodiment of a FIGS. 17 through 21 are representative of a user application module 80 comprising a user fitness application. More in particular, user application module 80 comprises a plurality of user application elements 82 which are overlain onto the composite video display 50. As one example, in FIG. 17, a plurality of user application elements 82 in the form of avatars representing participants in a virtual bicycle race relative to a user viewing the video display assembly. As further shown in FIG. 17, the navigation menu 59 comprises the user's personal metrics as well as those comprising the course, and a leaderboard showing the current position for each of the virtual participants relative to the user. An appropriate sensor assembly may be utilized by a user application module 80 so as to measure the actual performance of a user on a stationary cycle, or other such exercise device which may then be translated and displayed on a navigation menu 59, as shown in the illustrative embodiments of FIGS. 17 through 21. An interactive device 64, such as, by way of example only, a remote controller or mouse, may be utilized to facilitate a user's interaction with a user application module 80 via a navigation menu 59.

Figure 18:
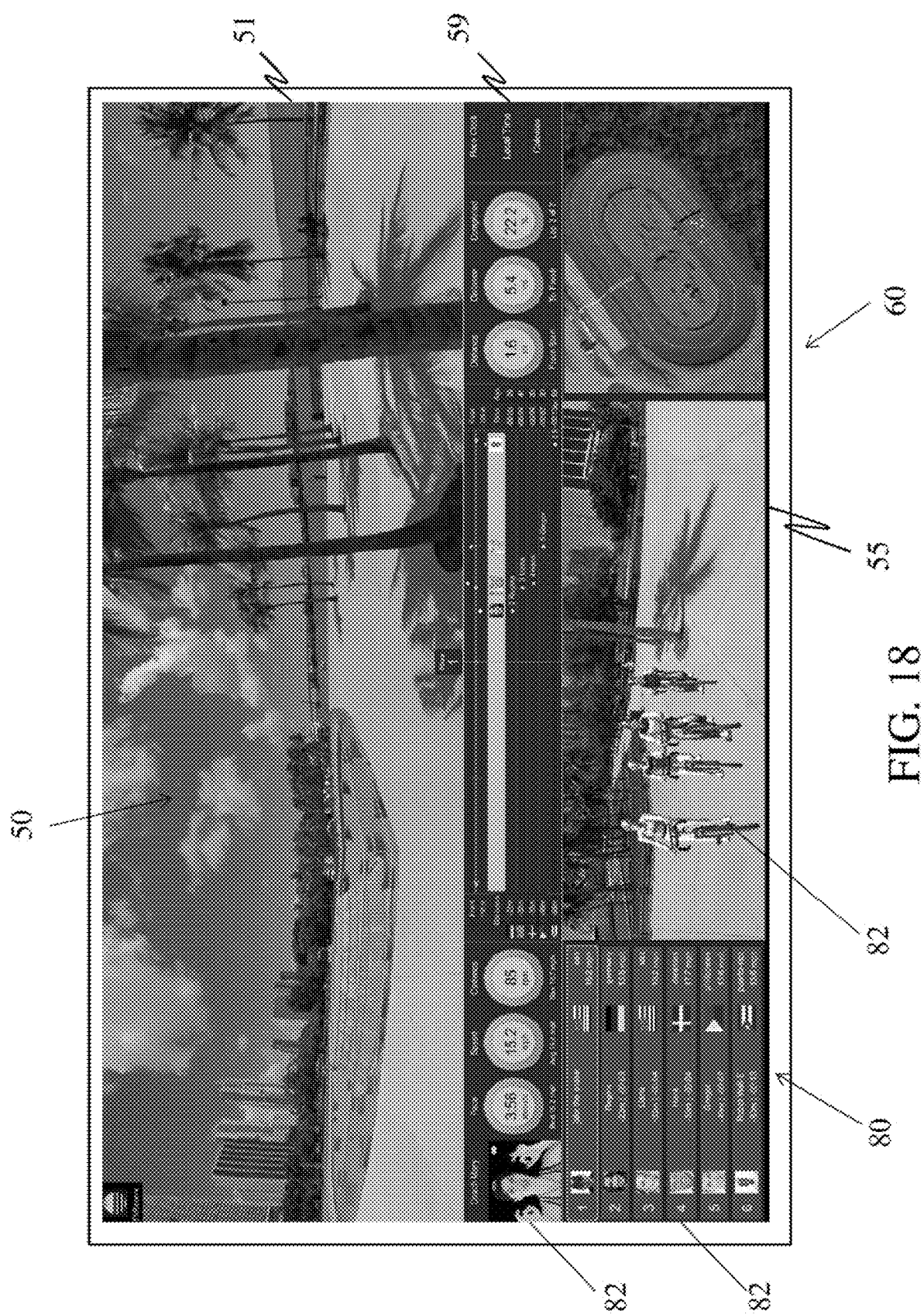
FIG. 18 is a screen shot illustrative of one other embodiment of an application module incorporating a multi-platform compatible processed 360° video file in accordance with the present invention.
Figure 19:
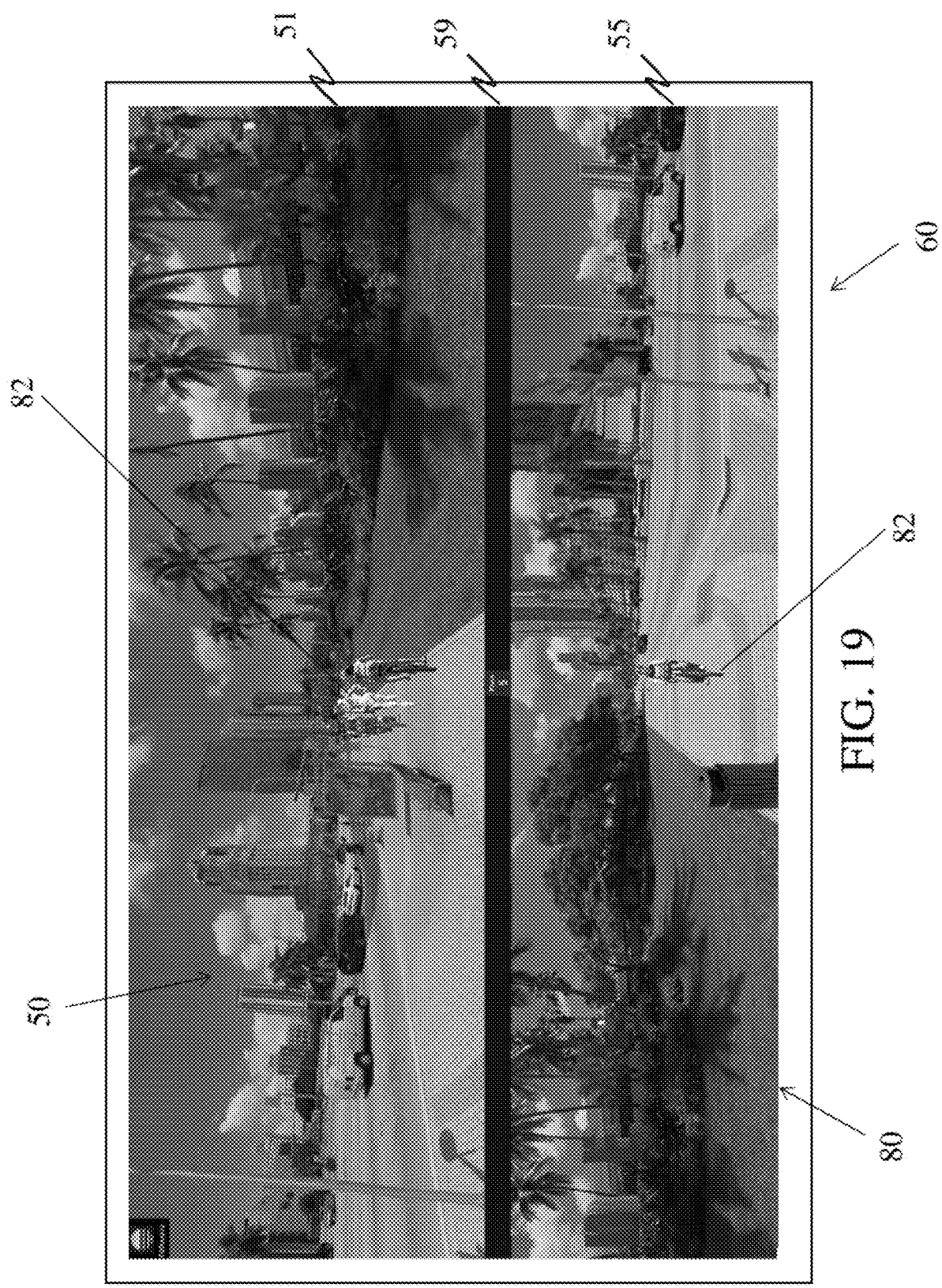
FIG. 19 is a screen shot illustrative of one further embodiment of an application module incorporating a multi-platform compatible processed 360° video file in accordance with the present invention.

FIG. 18 is illustrative of a user application module 80 in an alternative composite video display 50, wherein the user application elements 82 further comprise a virtual coach to advise a user on his or her status in the virtual race, as well as strategies to improve his or her performance therein. FIG. 19 is illustrative of a user application module 80 in yet another alternative composite video display 50, wherein the navigation menu 59 has been minimized in the composite video display 50.

Figure 20:
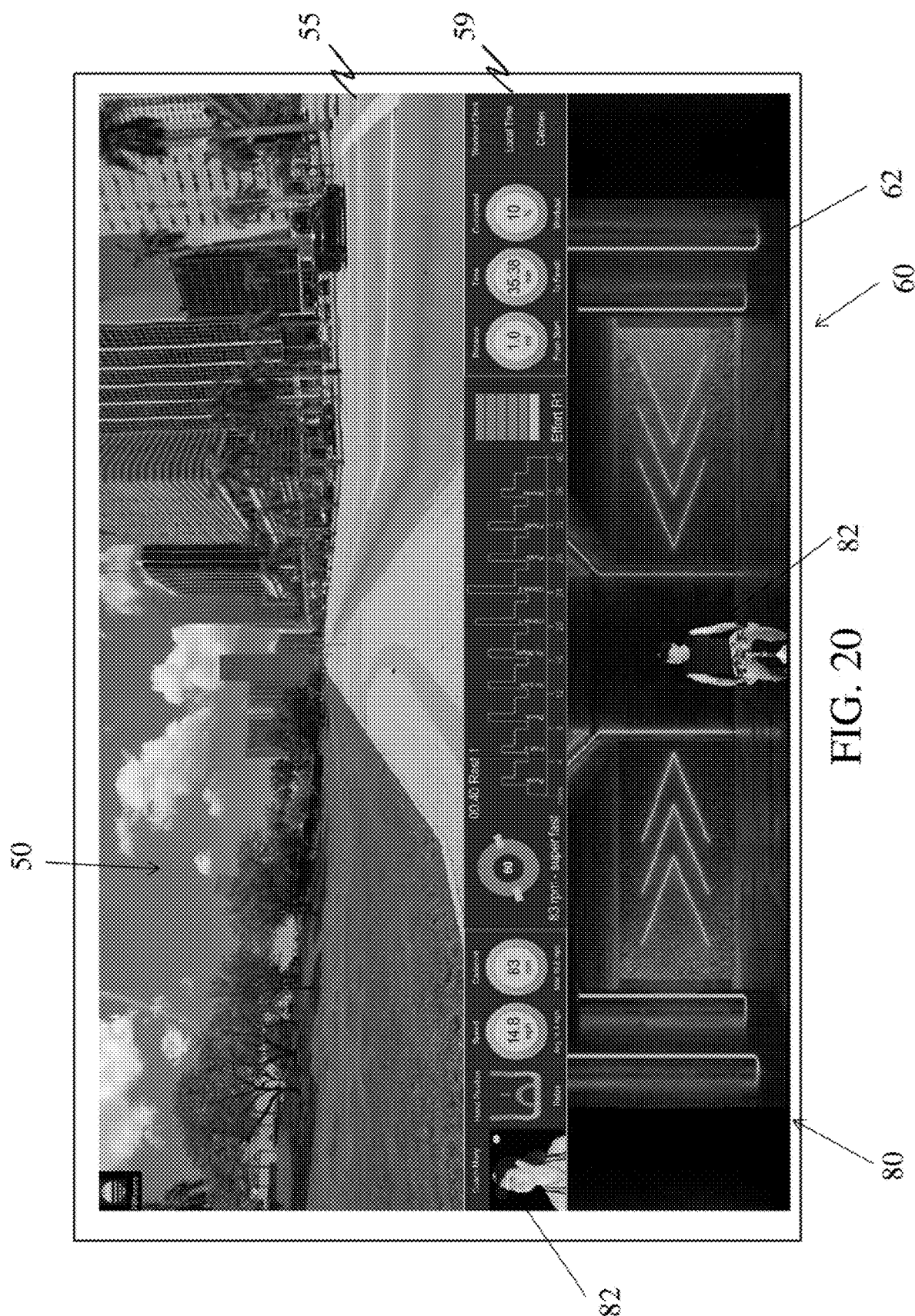
FIG. 20 is a screen shot illustrative of yet another embodiment of an application module incorporating a multi-platform compatible processed 360° video file in accordance with the present invention.
Figure 21:
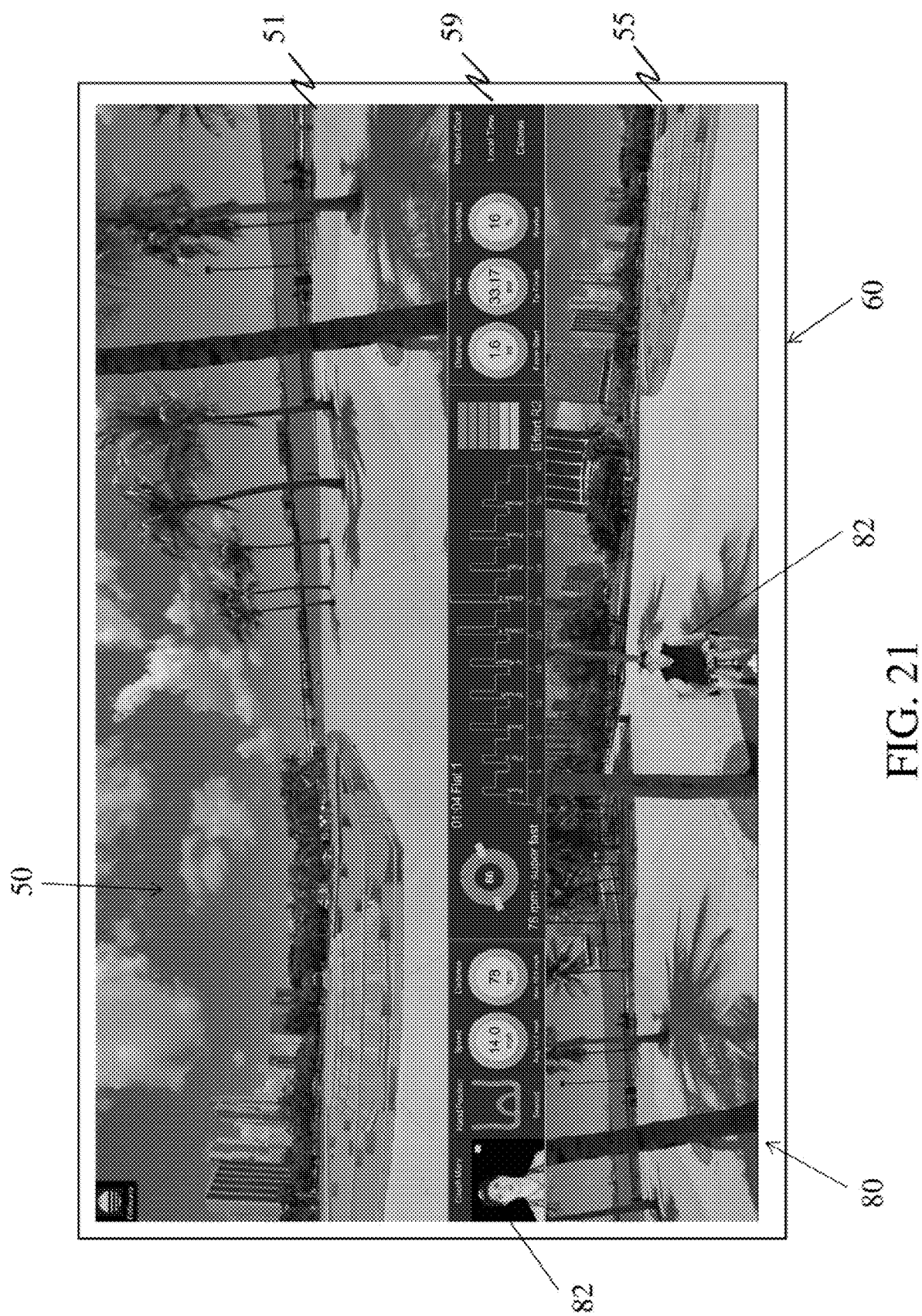
FIG. 21 is a screen shot illustrative of still one further embodiment of an application module incorporating a multi-platform compatible processed 360° video file in accordance with the present invention.

The illustrative embodiments of FIGS. 20 and 21 are representative examples of a user application module 80 comprising a solo fitness routine for a user, specifically, a spinning exercise regimen. More in particular, in the illustrative embodiment of FIG. 20, one user application element 82 includes an animated image of the user displayed in the lower portion of the video display screen 62, while a scenic view is presented for the user to view as he or she rides their stationary cycle or similar exercise device. As will be appreciated by those of skill in the art, it is within the scope and intent of the present invention to incorporate a live video image of the user as a user application element 82 projected onto a composite video display 50. As before, the navigation menu 59 includes statistics about the user's performance, and a virtual coach to prompt the user to perform. In the illustrative embodiment of FIG. 21, the plain background behind the animated image of the user 82 has been replaced with a bottom composite video display 55 to provide the user with the sensation of cycling outdoors.

Figure 22:
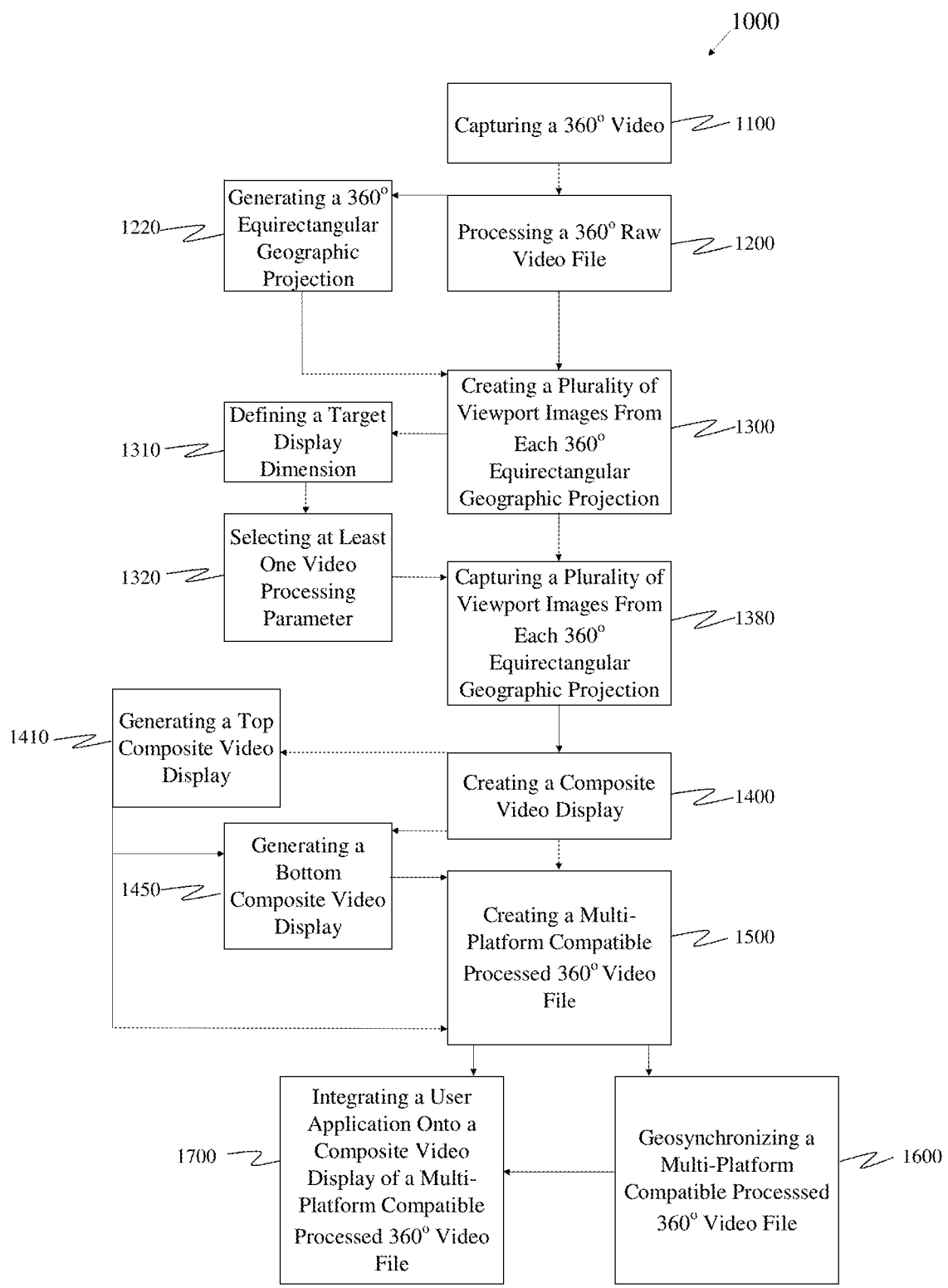
FIG. 22 is a diagrammatic representation of one illustrative embodiment of a method of capturing, processing and displaying a 360° video in accordance with the present invention.

Turning now to FIG. 22, one illustrative embodiment of a method for capturing, processing and displaying a 360° video 1000 is presented. As may be seen from FIG. 22, the present method 1000 begins with capturing a 360° video 1100. In at least one embodiment, this further entails generating a raw 360° video file.

The present method for capturing, processing and displaying a 360° video 1000 further comprises processing a raw 360° video file 1200. As noted above, in at least one embodiment, the present method 1000 includes converting a raw 360° video file into a 360° equirectangular video format. Looking again to the illustrative embodiment of FIG. 22, the present method 1000 also includes generating a 360° equirectangular geographic projection from each frame of a raw 360° video file 1220.

With continued reference to the illustrative embodiment of FIG. 22, the present method for capturing, processing and displaying a 360° video 1000 includes creating a plurality of viewport images from each 360° equirectangular geographic projection 1300. As before, a plurality of video processing parameters are input to a 360° video processing assembly in order to create a plurality of viewport images 1300. In at least one embodiment, the plurality of video processing parameters include a target display dimension, and in at least one further embodiment, the plurality of video processing parameters include a target display width and a target display height.

At least one further embodiment of the present method for capturing, processing and displaying a 360° video 1000 comprises selecting at least one video processing parameter 1320. Also as before, the plurality of video processing parameters may include one or more of a predetermined video display layout, a display height ratio, a viewport width, a viewport height, viewport origin coordinates, viewport positioning coordinates, a viewport field of view angle and/or a viewport center heading angle. Of course, it will be appreciated that in at least one embodiment of the present method 1000, all of the foregoing plurality of video processing parameters are utilized by a 360° video processing assembly to create a plurality of viewport images from each 360° equirectangular geographic projection 1300, in accordance with the present invention.

Looking once again to the illustrative embodiment of FIG. 22, the present method for capturing, processing and displaying a 360° video 1000 also includes capturing each of a plurality of viewport images from each 360° equirectangular geographic projection 1380. As before, in at least one embodiment, the present method 1000 includes capturing each of a plurality of viewport images from each 360° equirectangular geographic projection 1380 at a rate of about thirty frames per second. In at least one further embodiment, the present method 1000 includes capturing each of a plurality of viewport images from each 360° equirectangular geographic projection 1380 at a rate of about sixty frames per second. As will be appreciated by those of skill in the art, the capture rate, whether thirty frames a second or sixty frames a second, is a function of the current state of the art in video processing, however, it understood to be within the scope and intent of the present invention to employ capture rates that are less than thirty frames per second or greater than sixty frame per second, including substantially greater than sixty frames per second.

In at least one further embodiment, the present method 1000 also includes capturing a plurality of geographical positioning coordinates corresponding to each frame of a raw 360° video, which may be correlated to each of the plurality of captured viewport images. In at least one embodiment, the geographical positioning coordinates corresponding to each of the plurality of captured viewport images include at least a latitude, longitude, and a heading angle in which the lens of the 360° video camera was directed at the time each frame of a raw 360° video was recorded.

After capturing a plurality of viewport images from each 360° equirectangular geographic projection 1380, the present method comprises creating a composite video display 1400 in accordance with at least one embodiment, the present method 1000 includes generating a top composite video display 1410. In at least one further embodiment, generating a top composite video display 1410 includes positioning a top left viewport image, a top center viewport image, and a top right viewport image in such a manner so as to create a seamless integration of the plurality of top viewport images to generate a top composite video display 1410. Similarly, in at least one embodiment, the present method 1000 includes generating a bottom composite video display 1450. As with the top composite video display, generating a bottom composite video display 1450 includes positioning a bottom left viewport image, a bottom center viewport image, and the top right viewport image in such a manner so as to create a seamless integration of the plurality of bottom viewport images to generate a bottom composite video display 1450. As may be seen from the illustrative embodiment of FIG. 22, creating a composite video display 1400 may include generating a top composite video display 1410, or generating a bottom composite video display 1450, or both.

At least one further embodiment of the present method for capturing, processing and displaying a 360° video 1000 further comprises combining a top composite video display and a bottom composite video display to generate a composite video display, such as those shown by way of example only in the illustrative embodiments of FIGS. 12 through 15.

With reference once again to the illustrative embodiment of FIG. 22, the present method 1000 further includes creating a multi-platform compatible processed 360° video file 1500. As before, a multi-platform compatible processed 360° video file may be an "mp4" file, a "mov" file, an "avi" file, etc. As such, and as disclosed and described above, creating a multi-platform compatible processed 360° video file 1500 in accordance with the present method 1000 results in a video file which may be played on any of a plurality of video display assemblies from the screen of a smart phone to an ultrahigh definition video monitor.

With continued reference to the illustrative embodiment of FIG. 22, the present method for capturing, processing and displaying a 360° video 1000 in at least one embodiment includes geosynchronizing the processed 360° video file 1600. More in particular, geosynchronizing the processed 360° video file 1600 comprises correlating the plurality of geographical positioning coordinates for each frame of a raw 360° video with a corresponding one of each of the plurality of captured viewport images of the multi-platform compatible processed 360° video file.

In at least one further embodiment, the present method for capturing, processing and displaying a 360° video 1000 also includes integrating a user application onto a multi-platform processed 360° video file 1700. As will be appreciated by those of skill in the art, the number of useful applications which may benefit from integration with a multi-platform processed 360° video are essentially limitless. Examples of user applications which may benefit from integration with a with a multi-platform processed 360° video in accordance with the present invention include racing, touring, exploring, travelogues, movies, real estate, inspections, engineering, surveying, drone videography, security, surveillance, law enforcement and military applications. The present invention lends itself to integration into numerous user application including, by way of example, those wherein navigation with a mouse or other such device is not practical or convenient; applications which are not amenable to integration into virtual reality projections; as well as applications that do not require specialized equipment or training, thus making them more acceptable to a wider segment of society.

In still one further embodiment, the present method for capturing, processing and displaying a 360° video 1000 also includes integrating a user application onto a multi-platform processed 360° video file 1700, wherein the multi-platform processed 360° video file has been geosynchronized, as disclosed hereinabove.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

Exemplary Portion of a 360° Video Processing Algorithm (36)

```
//================================================
================================================
    // For Each Screen Layout configuration set by the vari-
able "layout_type" (the
    // total number of different layouts is 16) we must define
each of the six BVT
    // views direction angle independently.
    //
    // Camera_1_Rotation_Angle—top front
    // Camera 2 Rotation_Angle—top left
    // Camera 3 Rotation_Angle—top right
    // Camera 4 Rotation_Angle—bottom rear
    // Camera 5 Rotation_Angle—bottom left
    // Camera 6 Rotation_Angle—bottom right
    //
    // There is a top BVT set (top left, top front, top right) and
a bottom BVT
    // set (bottom left, bottom rear, bottom right)
    //
    // The bottom set is optional and can be set to look behind
the top BVT or in the
    // same direction.
    //
//================================================
================================================
    private void BVTRotationPatentSettings( )
    {
    try
    {
        //--------------------------------------------------------
        --------
        // Where "Camera_HeadingOffset_Angle" is the offset
            angle from the front
        // of the actual 360 video camera front direction. For
            example
        // the four primary offset angles are:
        //
        // Front—Camera_HeadingOffset_Angle=0
        // Right—Camera_HeadingOffset_Angle=90
        // Rear—Camera_HeadingOffset_Angle=180
        // Left—Camera_HeadingOffset_Angle=270
        //
        // Also any angle in the range 0 to 360 degree will also
            work. This is
        // used to be able to spin the BVT camera views.
        //--------------------------------------------------------
        --------
        float Camera_HeadingOffset_Angle=mainheadAz;
        //------------------------------------------------
        // BVT camera rotation angle to set the top BVT view
        // (top left, top front, top right)
        //------------------------------------------------
        float Camera_1_Rotation_Angle=0.0f;
        Camera_1_Rotation_Angle=90.0f+Camera_Heading-
            Offset_Angle;
        if (layout_type==3)
        {
            // Full 360 format . . . allows camera view to tilt up
                or down
            // Set Top Front Camera view display direction
            camera_front.transform.rotation=Quaternion.Euler
                (UpDownAz, Camera_1_Rotation_Angle, 0.0f);
        }
        else
        {
            // we have a top BVT layout . . . does not allow
                camera view to tilt up or down
            // Set Top Front Camera view display direction
            camera_front.transform.rotation=Quaternion.Euler
                (0.0f, Camera_1_Rotation_Angle, 0.0f);
        }
        // Set Top Left Camera view display direction
        // Set the offset angle depending on the BVT layout
            type
        // Each different layout has different camera view offset
            angle
        float BVT_TopLeft_Offset_Angle=0.0f;
        if                                      (layout_type==2)
            BVT_TopLeft_Offset_Angle=5.9f-9.9f;
        if                                      (layout_type==5)
            BVT_TopLeft_Offset_Angle=5.9f-9.9f;
        if                                      (layout_type==1)
            BVT_TopLeft_Offset_Angle=8.2f;
        if                                      (layout_type==0)
            BVT_TopLeft_Offset_Angle=8.2f;
        if                                     (layout_type==10)
            BVT_TopLeft_Offset_Angle=8.2f;
        if                                     (layout_type==11)
            BVT_TopLeft_Offset_Angle=19.7f;
        if                                     (layout_type==12)
            BVT_TopLeft_Offset_Angle=26.4f;
        if                                     (layout_type==13)
            BVT_TopLeft_Offset_Angle=32.0f;
        if                                     (layout_type==14)
            BVT_TopLeft_Offset_Angle=35.2f;
        if                                     (layout_type==15)
            BVT_TopLeft_Offset_Angle=38.0f;
        if                                     (layout_type==16)
            BVT_TopLeft_Offset_Angle=38.0f;
        float
            Camera_2_Rotation_Angle=BVT_TopLeft_Offset_
            Angle+Camera_HeadingOffset_Angle;
        camera_left.transform.rotation=Quaternion.Euler(0.0f,
            Camera_2_Rotation_Angle, 0.0f);
        // Set Top Right Camera view display direction
        // Set the offset angle depending on the BVT layout
            type
        // Each different layout has different camera view offset
            angle
        float BVT_TopRight_Offset_Angle=0.0f;
        if                                      (layout_type==2)
            BVT_TopRight_Offset_Angle=174.2f+10.0f;
        if                                      (layout_type==5)
            BVT_TopRight_Offset_Angle=174.2f+10.0f;
        if                                      (layout_type==1)
            BVT_TopRight_Offset_Angle=171.9f;
        if                                      (layout_type==0)
            BVT_TopRight_Offset_Angle=171.9f;
        if                                     (layout_type==10)
            BVT_TopRight_Offset_Angle=171.9f;
        if                                     (layout_type==11)
            BVT_TopRight_Offset_Angle=160.4f;
        if                                     (layout_type==12)
            BVT_TopRight_Offset_Angle=153.7f;
        if                                     (layout_type==13)
            BVT_TopRight_Offset_Angle=148.1f;
        if                                     (layout_type==14)
            BVT_TopRight_Offset_Angle=144.9f;
        if                                     (layout_type==15)
            BVT_TopRight_Offset_Angle=142.1f;
        if                                     (layout_type==16)
            BVT_TopRight_Offset_Angle=142.1f;
        float    Camera_3_Rotation_Angle=BVT_TopRight_
            Offset_Angle+Camera_HeadingOffset_Angle;
```

```
camera_right.transform.rotation=Quaternion.Euler
    (0.0f, Camera_3_Rotation_Angle, 0.0f);
//----------------------------------------------------------
// BVT camera rotation angle to set the bottom BVT
    view
// (bottom left, bottom rear, bottom right)
//
// Note: the bottom BVT 3 camera views have several
    additional
// function different than the top BVT views. These
    include
// the following:
//
// 1) the BVT bottom 3 views can be set to look in the
    "behind"
// top BVT direction or can be set to look in the same
    direction
// as the top BVT. When the flag variable
    "is360Behind" is set to
// "true" then the bottom BVT views will look in the
    behind direction.
//
// 2) the 3 bottom views can be set to be either BVT or
    broken BVT
// in BVT mode, the tilt angle "UpDownAz" is set to
    zero. If the
// the tilt angle "UpDownAz" is non-zero then the BVT
    view
// will be broken and each of the three bottom views
    will be
// tilt up or down and operated independently.
//----------------------------------------------------------
float Behind_Offset_Angle=180;
if (is360Behind==false) Behind_Offset_Angle=0;
// Set Bottom Rear Camera view display direction
float    Camera_4_Rotation_Angle=90.0f+Camera_
    HeadingOffset_Angle+Behind_Offset_Angle;
camera_rear.transform.rotation=Quaternion.Euler(Up-
    DownAz, Camera_4_Rotation_Angle, 0.0f);
// Set Bottom Left Camera view display direction
// Set the offset angle depending on the BVT layout
    type
// Each different layout has different camera view offset
    angle
float BVT_BottomLeft_Offset_Angle=0.0f;
if                              (layout_type==1)
    BVT_BottomLeft_Offset_Angle=5.9f+2.3f;
if                              (layout_type==2)
    BVT_BottomLeft_Offset_Angle=5.9f-9.9f;
if                              (layout_type==0)
    BVT_BottomLeft_Offset_Angle=8.2f;
if                              (layout_type==10)
    BVT_BottomLeft_Offset_Angle=8.2f;
if   (layout_type==11)    BVT_BottomLeft_Offset_
    Angle=-0.7f;
if   (layout_type==12)    BVT_BottomLeft_Offset_
    Angle=-12.3f;
if   (layout_type==13)    BVT_BottomLeft_Offset_
    Angle=-27.7f;
if   (layout_type==14)    BVT_BottomLeft_Offset_
    Angle=-52.7f;
if   (layout_type==15)    BVT_BottomLeft_Offset_
    Angle=-61.6f;
if   (layout_type==16)    BVT_BottomLeft_Offset_
    Angle=-61.6f;
float  Camera_5_Rotation_Angle=BVT_BottomLeft_
    Offset_Angle+Camera_HeadingOffset_Angle+Be-
    hind_Offset_Angle;
camera_rearleft.transform.rotation=Quaternion.Euler
    (UpDownAz, Camera_5_Rotation_Angle, 0.0f);
// Set Bottom Right Camera view display direction
// Set the offset angle depending on the BVT layout
    type
// Each different layout has different camera view offset
    angle
float BVT_BottomRight_Offset_Angle=0.0f;
if                              (layout_type==1)
    BVT_BottomRight_Offset_Angle=174.2f+-2.3f;
if                              (layout_type==2)
    BVT_BottomRight_Offset_Angle=174.2f+10.0f;
if                              (layout_type==0)
    BVT_BottomRight_Offset_Angle=171.9f;
if                              (layout_type==10)
    BVT_BottomRight_Offset_Angle=171.9f;
if                              (layout_type==11)
    BVT_BottomRight_Offset_Angle=180.8f;
if                              (layout_type==12)
    BVT_BottomRight_Offset_Angle=192.4f;
if                              (layout_type==13)
    BVT_BottomRight_Offset_Angle=207.8f;
if                              (layout_type==14)
    BVT_BottomRight_Offset_Angle=232.8f;
if                              (layout_type==15)
    BVT_BottomRight_Offset_Angle=241.7f;
if                              (layout_type==16)
    BVT_BottomRight_Offset_Angle=241.7f;
float Camera_6_Rotation_Angle=BVT_BottomRight_
    Offset_Angle+Camera_HeadingOffset_Angle+Be-
    hind_Offset_Angle;
camera_rearright.transform.rotation=Quaternion.Euler
    (UpDownAz, Camera_6_Rotation_Angle, 0.0f);
//------------------------------------------
// Set each of the six view camera
// FOV—Field Of View delta angle
// depending on layout type
//------------------------------------------
float camera_1_FOV=70;
float camera_2_FOV=70;
float camera_3_FOV=70;
float camera_4_FOV=70;
float camera_5_FOV=70;
float camera_6_FOV=70;
if (layout_type==14)
{
    camera_4_FOV=90;
    camera_5_FOV=90;
    camera_6_FOV=90;
}
if (layout_type==15)
{
    camera_4_FOV=90;
    camera_5_FOV=90;
    camera_6_FOV=90;
}
if (layout_type==16)
{
    camera_4_FOV=90;
    camera_5_FOV=90;
    camera_6_FOV=90;
}
```

```
// top BVT set
BVT_Set_Camera_FOV(1, camera_1_FOV);
BVT_Set_Camera_FOV(2, camera_2_FOV);
BVT_Set_Camera_FOV(3, camera_3_FOV);
// bottom BVT set
BVT_Set_Camera_FOV(4, camera_4_FOV);
BVT_Set_Camera_FOV(5, camera_5_FOV);
BVT_Set_Camera_FOV(6, camera_6_FOV);
}
catch (Exception ex)
{
   string serr="BVT rotation Error:"+ex;
   UnityEngine.Debug.Log(serr);
}
}
//==========================================
==========================================
//
// For Each Screen Layout configuration set by the variable "layout_type" (the
// total number of different layouts is 16) we must define each of the six BVT
// views screen X, Y, Width, and Height independently.
//
// inputs are monitor screen width and height
//
// Camera_1—top front
// Camera_2—top left
// Camera_3—top right
// Camera_4—bottom rear
// Camera_5—bottom left
// Camera_6—bottom right
//
// There is a top BVT set (top left, top front, top right) and a bottom BVT
// set (bottom left, bottom rear, bottom right)
//
// The bottom set is optional.
//
//==========================================
==========================================
   private void BVT_Set_Camera_Screen_Position_Size (float screenWidth, float screenHeight)
   {
   // compute camera width size
   float camera_1_Width=screenWidth/3.0f;
   float camera_2_Width=screenWidth/3.0f;
   float camera_3_Width=screenWidth/3.0f;
   float camera_4_Width=screenWidth/3.0f;
   float camera_5_Width=screenWidth/3.0f;
   float camera_6_Width=screenWidth/3.0f;
   // compute camera X screen position
   float camera_2_X=0;
   float camera_1_X=camera_2_X+camera_2_Width;
   float camera_3_X=camera_1_X+camera_1_Width;
   float camera_5_X=camera_2_X;
   float camera_4_X=camera_1_X;
   float camera_6_X=camera_3_X;
   // set specific layout screen height ratio
   float heightRatio=0.48f;
   if (layout_type==1) heightRatio=0.48f;
   if (layout_type==2) heightRatio=0.48f;
   if (layout_type==0) heightRatio=0.48f;
   if (layout_type==10) heightRatio=0.48f;
   if (layout_type==11) heightRatio=0.59f;
   if (layout_type==12) heightRatio=0.66f;
   if (layout_type==13) heightRatio=0.75f;
   if (layout_type==14) heightRatio=0.80f;
   if (layout_type==15) heightRatio=0.85f;
   if (layout_type==16) heightRatio=0.85f;
   // compute camera height size
   float camera_1_H=screenHeight*heightRatio;
   float camera_2_H=camera_1_H;
   float camera_3_H=camera_1_H;
   float menuBarHeightSize=40.0f;
   float camera_4_H=screenHeight−menuBarHeightSize−camera_1_H;
   float camera_5_H=camera_4_H;
   float camera_6_H=camera_4_H;
   // compute camera Y screen position
   float camera_1_Y=0.0f;
   float camera_2_Y=0.0f;
   float camera_3_Y=0.0f;
   float camera_4_Y=camera_1_Y+menuBarHeightSize−camera_1_H;
   float camera_5_Y=camera_4_Y;
   float camera_6_Y=camera_4_Y;
   // top BVT set
   BVT_Set_Camera_Screen(1, camera_1_X, camera_1_Y, camera_1_Width, camera_1_H);
   BVT_Set_Camera_Screen(2, camera_2_X, camera_2_Y, camera_2_Width, camera_2_H);
   BVT_Set_Camera_Screen(3, camera_3_X, camera_3_Y, camera_3_Width, camera_3_H);
   // bottom BVT set
   BVT_Set_Camera_Screen(4, camera_4_X, camera_4_Y, camera_4_Width, camera_4_H);
   BVT_Set_Camera_Screen(5, camera_5_X, camera_5_Y, camera_5_Width, camera_5_H);
   BVT_Set_Camera_Screen(6, camera_6_X, camera_6_Y, camera_6_Width, camera_6_H);
   }
```

What is claimed is:

1. A 360° video capture, processing and display system comprising:
   a 360° video camera to capture a 360° raw video file;
   a 360° video processing assembly to generate a plurality of 360° equirectangular geographic projections from said 360° raw video file;
   said 360° video processing assembly comprising a 360° video processing algorithm utilizing a plurality of video processing parameters to capture a plurality of viewport images from each of said plurality of 360° equirectangular geographic projections;
   a plurality of composite video displays;
   each said composite video display comprising said plurality of viewport images from a corresponding one of each of said plurality of 360° equirectangular geographic projection;
   each said composite video display including at least a top composite video display and a bottom composite video display, at least one of said top composite video display or said bottom composite video display comprising a seamless integration of corresponding ones of said plurality of viewport images;
   said top composite video display comprising a plurality of viewport images corresponding to a front portion of the 360° equirectangular geographic projections;
   said bottom composite video display comprising a plurality of viewport images corresponding to a rear portion of the 360° equirectangular geographic projections;
   each of said top composite video display and said bottom composite video display comprising a field of view of 210°;

a multi-platform compatible processed 360° video file comprising said plurality of composite video displays; and said multi-platform compatible processed 360° video file viewable on a video display assembly.

2. The system as recited in claim 1 wherein said top composite video display comprises a top left viewport image, a top center viewport image and a top right viewport image.

3. The system as recited in claim 1 wherein said bottom composite video display comprises a bottom left viewport image, a bottom center viewport image and a bottom right viewport image.

4. The system as recited in claim 1 wherein said plurality of video processing parameters comprises a predetermined video display layout.

5. The system as recited in claim 1 wherein said plurality of video processing parameters comprises a display height ratio.

6. The system as recited in claim 1 wherein said plurality of video processing parameters comprises a viewport field of view angle.

7. The system as recited in claim 1 wherein said plurality of video processing parameters comprises a viewport center heading angle.

8. The system as recited in claim 1 wherein said 360° video processing assembly captures a plurality of viewport images from each of said plurality of 360° equirectangular geographic projections at a rate of about thirty frames per second to about sixty frames per second.

9. The system as recited in claim 1 wherein said 360° video processing assembly captures a plurality of geographical positioning coordinates corresponding to each of said plurality of viewport images captured from each of said plurality of 360° equirectangular geographic projections.

10. The system as recited in claim 9 wherein said plurality of geographical positioning coordinates comprises a latitude, a longitude and a camera heading angle for each of said plurality of viewport images.

11. The system as recited in claim 10 further comprising a geographical positioning coordinate file comprising said plurality of geographical positioning coordinates corresponding to each of said plurality of captured viewport images.

12. A 360° video processing system to create a multi-platform compatible processed 360° video file from a 360° raw video file which is viewable on a video display screen, said system comprising:

a 360° video processing assembly which generates a 360° equirectangular geographic projection from the 360° raw video file;

said 360° video processing assembly comprising a 360° video processing algorithm utilizing a plurality of video processing parameters to capture a plurality of viewport images from each of a plurality of 360° equirectangular geographic projections;

a plurality of composite video displays;

each said composite video display comprising said plurality of viewport images from a corresponding one of each of said plurality of 360° equirectangular geographic projections;

each said composite video display including at least one of a top composite video display comprising a top left viewport image, a top center viewport image and a top right viewport image or a bottom composite video display comprising a bottom left viewport image, a bottom center viewport image and a bottom right viewport image, at least one of said top composite video display or said bottom composite video display comprising a seamless integration of corresponding ones of said plurality of viewport images;

the top left viewport image, the top center viewport image and the top right viewport image corresponding to a front portion of the 360° equirectangular geographic projections;

the bottom left viewport image, the bottom center viewport image and the bottom right viewport image corresponding to a rear portion of the 360° equirectangular geographic projections;

each of said top composite video display and said bottom composite video display comprising a field of view of 210°;

a multi-platform compatible processed 360° video file comprising said plurality of composite video displays; and said multi-platform compatible processed 360° video file viewable on the video display screen.

13. The system as recited in claim 12 wherein each of said top composite video display and said bottom composite video display comprises a seamless integration of corresponding ones of said plurality of viewport images.

14. The system as recited in claim 13 wherein said plurality of video processing parameters comprises a predetermined video display layout.

15. The system as recited in claim 13 wherein said plurality of video processing parameters comprises a display height ratio.

16. The system as recited in claim 15 wherein said plurality of video processing parameters comprises a viewport field of view angle.

17. The system as recited in claim 16 wherein said plurality of video processing parameters comprises a viewport center heading angle.

18. A method for capturing, processing and displaying a 360° video on a video display screen, the method comprising:

capturing a 360° video;

generating a plurality of 360° equirectangular geographic projections;

selecting one or more of a plurality of video processing parameters, wherein the video processing parameters include a predetermined video display layout, a display height ratio, a viewport field of view angle, and a viewport heading angle;

capturing a plurality of viewport images from each of the plurality of 360° equirectangular geographic projections utilizing the one or more video processing parameters;

generating a top composite video display comprising a plurality of viewport images corresponding to a front portion of the 360° equirectangular geographic projections, said top composite video display comprising a field of view of 210°;

generating a bottom composite video display comprising a plurality of viewport images corresponding to a rear portion of the 360° equirectangular geographic projections, said bottom composite video display comprising a field of view of 210°;

combining the top composite video display and the bottom composite video display from each of the plurality of 360° equirectangular geographic projection to form a composite video display; and creating a multi-platform compatible processed 360° video file comprising a plurality of composite video displays, wherein the multi-platform compatible processed 360° video file is viewable on the video display screen.

19. The method as recited in claim 18 wherein the 360° video processing assembly captures a plurality of viewport images from each of the plurality of 360° equirectangular geographic projections at a rate of about thirty frames per second to about sixty frames per second.

20. The method as recited in claim 18 further comprising capturing a plurality of geographical positioning coordinates corresponding to each of the plurality of captured viewport images, creating a geographical positioning coordinate file from the plurality of geographical positioning coordinates corresponding to each of the plurality of captured viewport images, and synchronizing each of the plurality of captured viewport images with the corresponding geographical positioning coordinates from the geographical positioning coordinate file.

* * * * *